(12) United States Patent
Spinger et al.

(10) Patent No.: US 12,223,735 B2
(45) Date of Patent: Feb. 11, 2025

(54) VEHICLE CAMERA VISION AND CONTROL SYSTEM AND METHOD

(71) Applicant: LUMILEDS LLC, San Jose, CA (US)

(72) Inventors: Benno Spinger, Aachen (DE); Dirk Vanderhaeghen, Wilrijk (BE); Ronald Johannes Bonne, Plainfield, IL (US); Wouter Schrama, Nuenen (NL); Norbert Lesch, Vaals (NL); Patrick van den Akker, Valkenburg aan de Geul (NL)

(73) Assignee: LUMILEDS, LLC, San Jose, CA (US)

( * ) Notice: Subject to any disclaimer, the term of this patent is extended or adjusted under 35 U.S.C. 154(b) by 78 days.

(21) Appl. No.: 18/226,121

(22) Filed: Jul. 25, 2023

(65) Prior Publication Data

US 2024/0029443 A1 Jan. 25, 2024

Related U.S. Application Data

(60) Provisional application No. 63/424,824, filed on Nov. 11, 2022, provisional application No. 63/424,827, (Continued)

(51) Int. Cl.
*G06V 20/56* (2022.01)
*B60Q 1/00* (2006.01)
(Continued)

(52) U.S. Cl.
CPC ........... *G06V 20/56* (2022.01); *B60Q 1/0023* (2013.01); *B60Q 1/085* (2013.01); *B60Q 1/1415* (2013.01); *B60Q 1/249* (2022.05); *B60R 1/24* (2022.01); *F21S 41/663* (2018.01); *F21V 23/0442* (2013.01); *G06T 7/521* (2017.01); *H04N 5/74* (2013.01); *H04N 23/10* (2023.01);
(Continued)

(58) Field of Classification Search
CPC ....................................................... G06V 20/56
See application file for complete search history.

(56) References Cited

U.S. PATENT DOCUMENTS

2008/0029701 A1  2/2008  Onozawa et al.
2020/0348127 A1  11/2020 Heinrich et al.
2023/0236320 A1  7/2023  Krause et al.

FOREIGN PATENT DOCUMENTS

EP       3067826 A1    9/2016
EP       3070641 A1    9/2016
WO    2013/117923 A1   8/2013

OTHER PUBLICATIONS

International Search Report and Written Opinion mailed Nov. 10, 2023 for PCT International Application No. PCT/US2023/028589.
(Continued)

*Primary Examiner* — Y Lee
(74) *Attorney, Agent, or Firm* — Volpe Koenig

(57) ABSTRACT

A camera is described that includes a first imager and a processor communicatively coupled to the first imager. The first imager captures images of a roadway on which a vehicle is located when operating. The processor, when operating, generates a signal to cause a first hybridized device in the vehicle to project a first patterned light on to an object on the roadway, generates a signal to cause the first imager to capture an image of the first patterned light projected on the object, receives the image from the first imager, and detects the object on the roadway based on the first patterned light captured in the image.

7 Claims, 17 Drawing Sheets

Related U.S. Application Data filed on Nov. 11, 2022, provisional application No. 63/424,819, filed on Nov. 11, 2022, provisional application No. 63/424,826, filed on Nov. 11, 2022, provisional application No. 63/391,933, filed on Jul. 25, 2022.

(51) Int. Cl.

| | |
|---|---|
| *B60Q 1/08* | (2006.01) |
| *B60Q 1/14* | (2006.01) |
| *B60Q 1/24* | (2006.01) |
| *B60R 1/24* | (2022.01) |
| *F21S 41/663* | (2018.01) |
| *F21V 23/04* | (2006.01) |
| *G06T 7/521* | (2017.01) |
| *H04N 5/74* | (2006.01) |
| *H04N 23/10* | (2023.01) |
| *H04N 23/56* | (2023.01) |
| *H04N 23/90* | (2023.01) |
| *G06T 7/55* | (2017.01) |

(52) U.S. Cl.
CPC .............. *H04N 23/56* (2023.01); *H04N 23/90* (2023.01); *B60Q 2300/052* (2013.01); *B60Q 2300/054* (2013.01); *B60Q 2300/30* (2013.01); *B60Q 2300/33* (2013.01); *B60R 2300/303* (2013.01); *B60R 2300/8093* (2013.01); *G06T 7/55* (2017.01); *G06T 2207/10048* (2013.01); *G06T 2207/30252* (2013.01); *G06V 2201/07* (2022.01)

(56) References Cited

OTHER PUBLICATIONS

Bell et al., "Structured Light Techniques and Applications." In Wiley Encyclopedia of Electrical and Electronics Engineering, J.G. Webster (Ed.). (2016). https://doi.org/10.1002/047134608X. W8298.

Geng, "Structured-light 3D surface imaging: a tutorial," Adv. Opt. Photon. 3, 128-160 (2011).

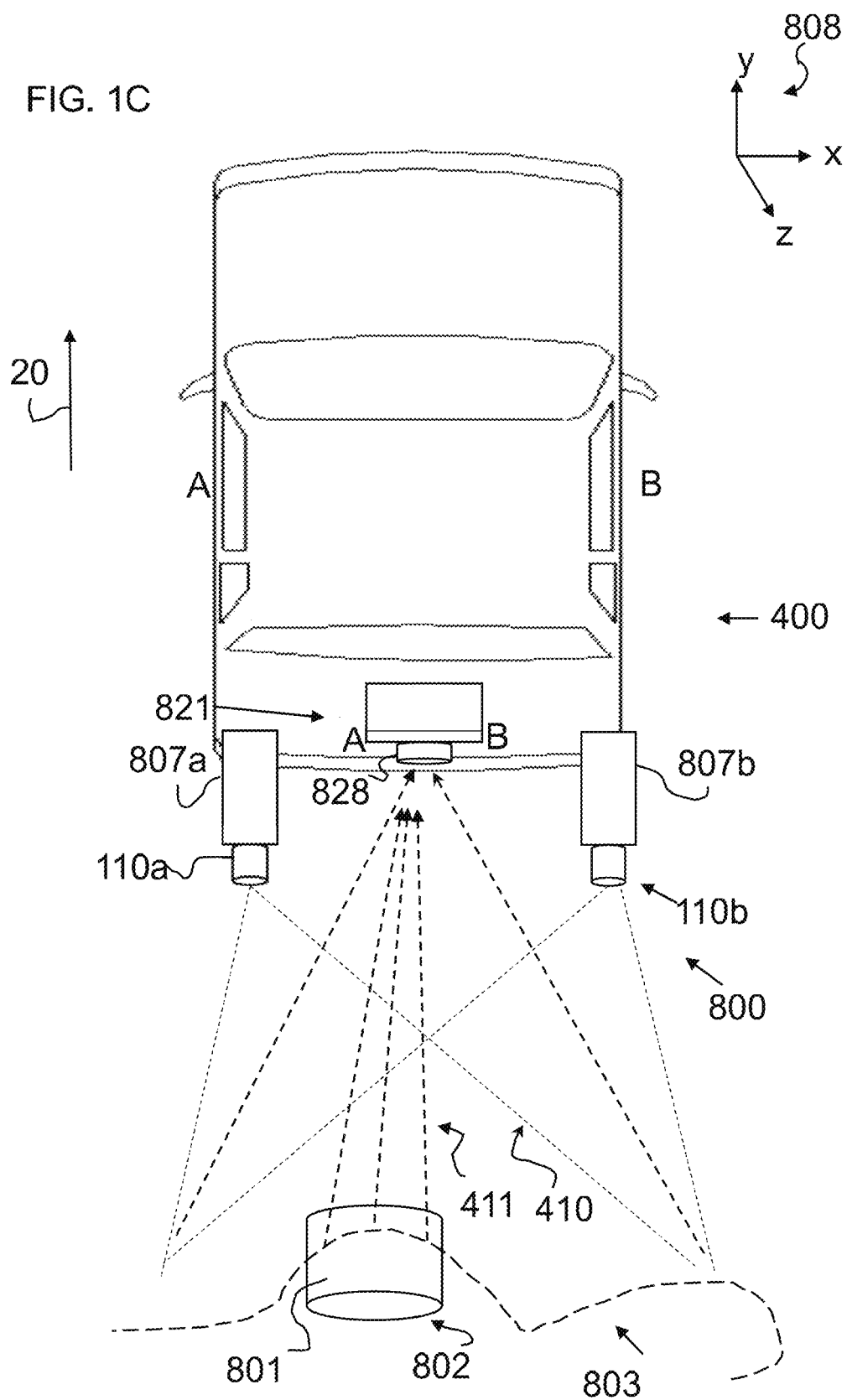

VEHICLE CAMERA VISION AND CONTROL SYSTEM AND METHOD

CROSS-REFERENCE TO RELATED APPLICATIONS

This application claims the benefit of U.S. Provisional Application No. 63/391,933, filed Jul. 25, 2022, U.S. Provisional Application No. 63/424,819, filed Nov. 11, 2022; U.S. Provisional Application No. 63/424,824, filed Nov. 11, 2022, U.S. Provisional Application No. 63/424,826, filed Nov. 11, 2022, and U.S. Provisional Application No. 63/424,827, flied Nov. 11, 2022, the contents of which are hereby incorporated herein by reference.

BACKGROUND

Camera vision will play an increasing role in autonomous vehicle vision systems. Unlike radio detection and ranging (RADAR) or Light Detection and Ranging (LiDAR) vision systems, cameras sense and measure light in the visible spectrum. This allows camera vision systems to perform functions that RADAR and LiDAR devices don't perform. For example, camera based systems can recognize colors and read text on road signs using image processing techniques.

SUMMARY

A camera is described that includes a first imager and a processor communicatively coupled to the first imager. The first imager captures images of a roadway on which a vehicle is located when operating. The processor, when operating, generates a signal to cause a first hybridized device in the vehicle to project a first patterned light on to an object on the roadway, generates a signal to cause the first imager to capture an image of the first patterned light projected on the object, receives the image from the first imager, and detects the object on the roadway based on the first patterned light captured in the image.

BRIEF DESCRIPTION OF THE DRAWINGS

A more detailed understanding can be had from the following description, given by way of example in conjunction with the accompanying drawings wherein:

FIG. 1C is a pictorial illustration of another example vehicle vision system;

DETAILED DESCRIPTION

Figure 1A:
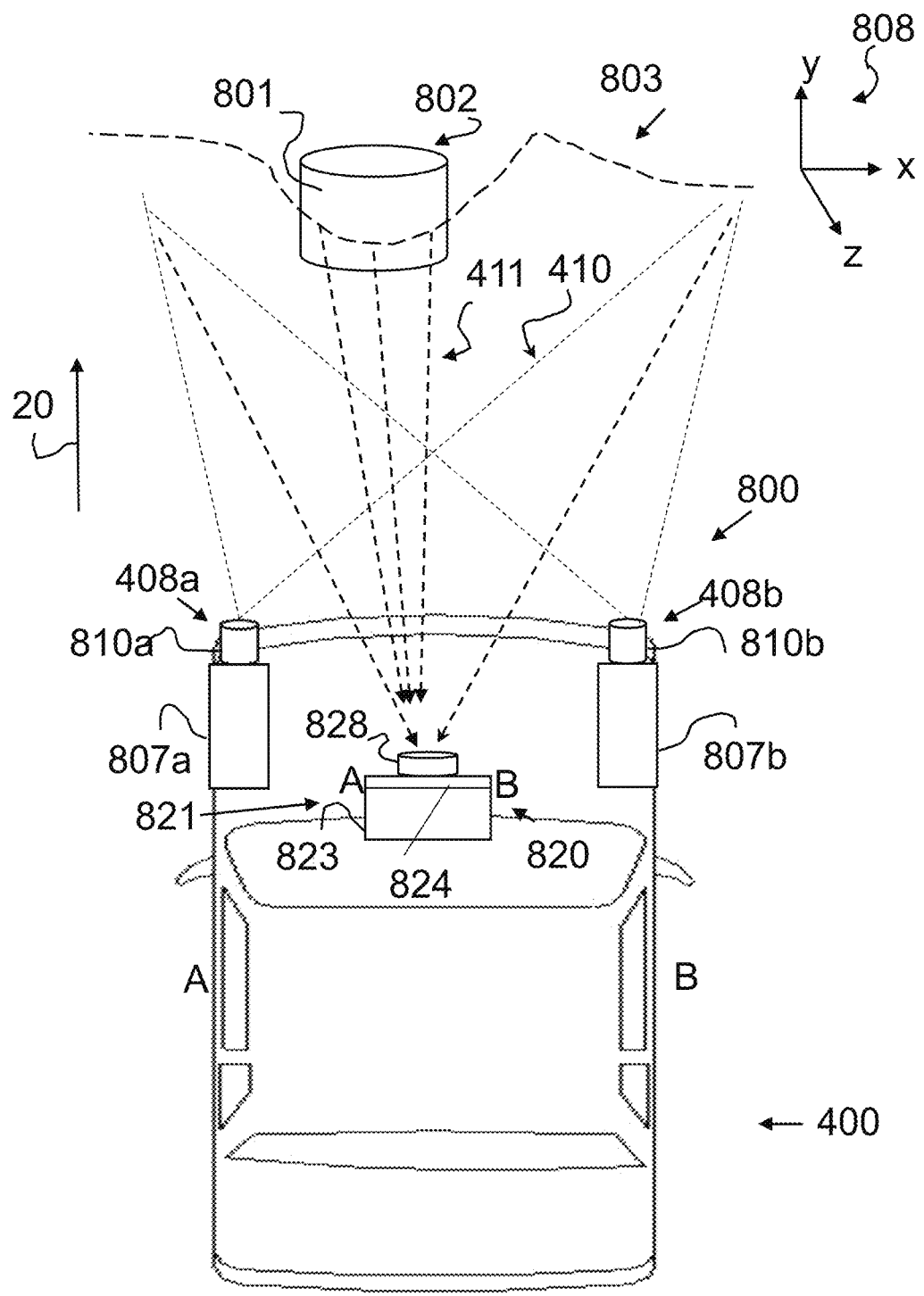
FIG. 1A is a pictorial illustration of an example vehicle vision system.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only, and they are not intended to limit the disclosure in any way. Like numbers refer to like elements throughout.

It will be understood that, although the terms first, second, third, etc., may be used herein to describe various elements, these elements should not be limited by these terms. These terms may be used to distinguish one element from another. For example, a first element may be termed a second element, and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element, or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "lower," "horizontal," or "vertical" may be used herein to describe a relationship of one element, layer, or region to another element, layer, or region as illustrated in the figures. It will be understood that these terms are intended to encompass different orientations of the device in addition to the orientation depicted in the figures.

As used herein, light-emitting diodes (LEDs), micro-light-emitting diodes (μLEDs), and pixels of hybridized devices may be referred to as being "turned on" and being "turned off." The term "turned on" may refer to the state, or the transition to the state, where current is allowed to flow through the LEDs, the μLEDs, and/or the pixels of the μLED arrays. The term "turned off" may refer to the state, or the transition to the state, where current is prevented from flowing through the LEDs, the μLEDs, and/or the pixels of the μLED arrays. In some embodiments, a μLED array may include thousands or millions of light emitting LEDs positioned together on centimeter-scale area substrates or smaller. Each pixel may comprise a μLED as described herein. The hybridized devices can support high-density pixels having a lateral dimension of less than about 100 μm by 100 μm. As used herein, a μLED refers to an independently controllable LED (e.g., groups of emitters in the μLED array or individual emitters in the μLED array are independently controllable). Alternatively, or in addition, a μLED may refer to an LED having lateral dimensions of about 1 to about 100 μm.

Conventional two-dimensional (2D) single-camera systems used in automobiles have at least one drawback. Unlike RADAR and LIDAR devices, the single-camera systems are unable to capture a surface geometry of imaged objects as well as the distance to the imaged objects from the camera. For example, traditional single-camera vision systems are unable to perform the ranging functions that are performed by RADAR and LiDAR. As a result, single-camera-based vision systems are limited in their ability to detect and distinguish 3-dimensional objects. Embodiments are described herein that are better able to capture a surface geometry of imaged objects, such as for use in automobiles, such as autonomous vehicles.

FIG. 1A is a pictorial diagram of an embodiment of a camera vision system 800 implemented in a vehicle 400. In the example illustrated in FIG. 1A, camera vision system 800 comprises first and second headlights 408a, 408b. First and second headlights 408a, 408b may each comprise headlight optics 810a, 810b respectively, and first and second light engines 807a, 807b respectively. System 800 may further comprise a camera 820, that may include an imager 821 and camera optics 828. Imager 821 may comprise a light sensing and measuring surface 824 and imager electronics 823. First headlight 408a and second headlight 408b may project visible light 410 generated by first and second light engines 807a, 807b respectively into a travel path 20 of vehicle 400 so as to illuminate a real-world scene 803 including three-dimensional (3D) objects, such as object 802. In some embodiments, headlights 408a, 408b may be offset from each other vertically or horizontally along the front of the vehicle 400. In addition, in some embodiments, the first and second headlights 408a and 408b may also illuminate the roadway in the travel path 20. Although FIG. 1A depicts an embodiment with two headlights, in additional embodiments, the camera vision system 800 may utilize two or more headlights. The additional headlights may have the same structure as headlights 408A and 408B. In addition, although depicted as headlights in the example embodiment depicted in FIG. 1B, in other embodiments, the headlights 408a, 408b may be turn signal indicator lights or any other appropriate type of vehicle lighting.

Figure 2:
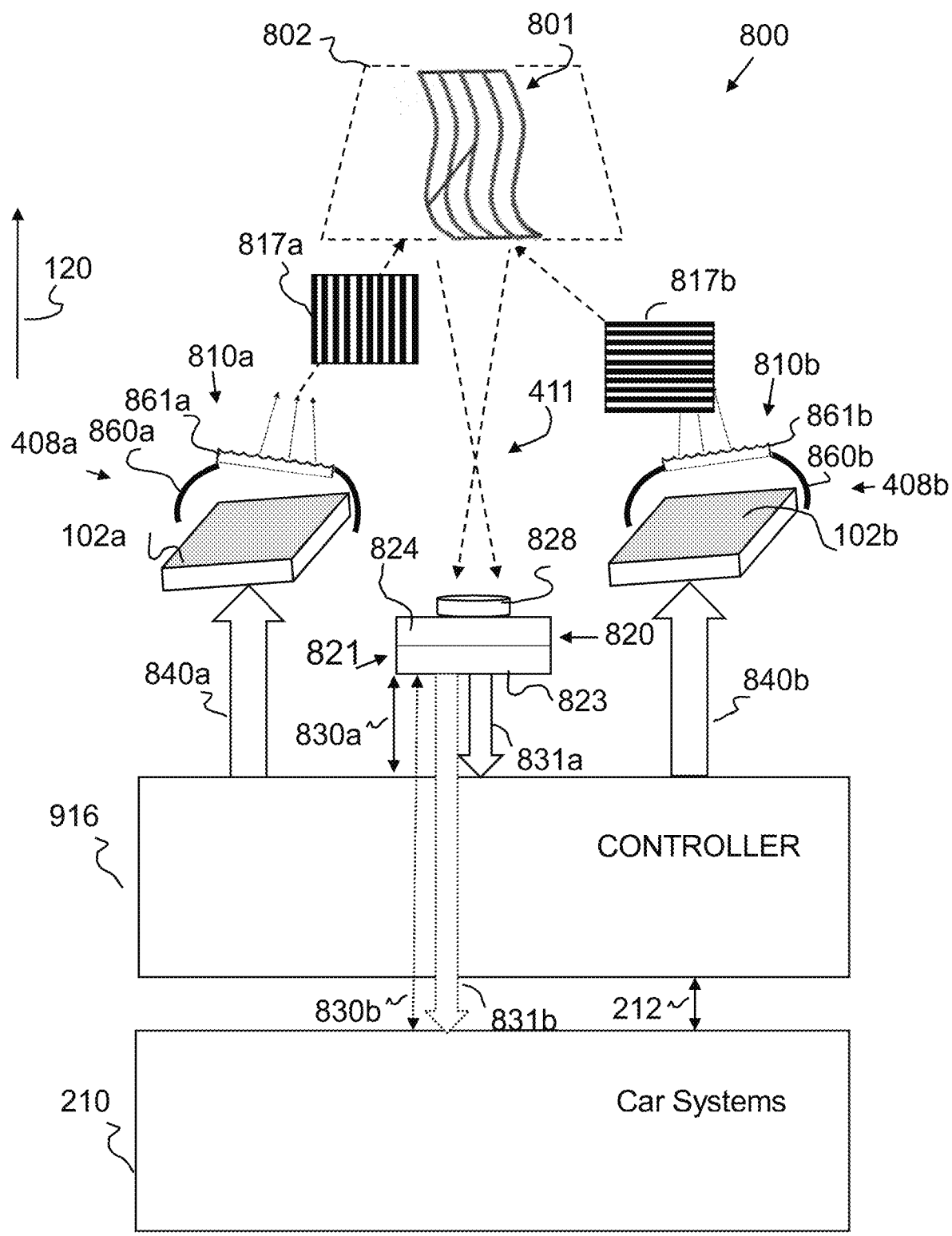
FIG. 2 is a functional block diagram of an example implementation of the system of FIG. 1A, FIG. 1B, FIG. 1C or FIG. 1D.

Object 802 can be defined by a 3D surface geometry 801, which can be expressed in terms of x, y, and z coordinates 808, where x extends horizontally, y extends vertically perpendicular to a path ground plane, and z extends in a direction from surface 801 to camera 820. First and second light engines 807a, 807b may be controlled by a controller (not visible in FIG. 1A) to generate first and second patterned light (as illustrated in FIG. 2). Headlight optics 810a, 810b may project the first and second patterned light into travel path 10 to illuminate at least portions of scene 803.

Camera 820 may be disposed in vehicle 400 between first headlight 408a and second headlight 408b so that light sensing and measuring surface 824 can sense visible light 411 comprising reflections of the first and second patterned light from a surface 801 of object 802. For example, camera 820 can be disposed in, attached or secured to a grille, dashboard, windshield, hood or roof of vehicle 400. Regardless of where camera 820 is positioned in or on vehicle 400, camera 820 may be arranged with respect to headlights 408a and 408b so that light sensing and measurement surface 824 of camera 820 is in a path of light 411 reflected from at least some portion of a surface 801 of at least one object 802 illuminated by light 410 emitted by headlights 408a and 408b. Camera 820 captures images of object 802 under the control of imager electronics 823 in response to capture control signals.

As seen in FIG. 1A, camera 820 may be arranged with respect to first headlight 408a and second headlight 408b such that first headlight 408a may project light from a side A of camera 820 to illuminate scene 803 including object 802. Second headlight 408b may project light from a side B, opposite side A of camera 820, to illuminate scene 803 including object 802. Side A corresponds to headlight 408a on side A of vehicle 400 and side B of camera 820 corresponds to headlight 408b on side B of vehicle 400.

Optics 810a, 810b may include one or more light guides (not shown in FIG. 1A). The one or more light guides can be edge lit or may have an interior opening that defines an interior edge of the light guide. Light engines 807a, 807b may be disposed in interior openings of the one or more light guides such that they may inject light into the interior edge (interior opening light guide) or exterior edge (edge lit light guide) of the one or more light guides. In embodiments, the one or more light guides may further shape the patterned light emitted by light engines 807a and 807b, in accordance with, for example, a gradient, a chamfered distribution, a narrow distribution, a wide distribution, or an angular distribution so as to project light 410 to optimize illumination of travel path 20 in accordance with various design considerations or constraints.

In the embodiment shown in FIG. 1A, optical axes of optics 810a, 810b may be arranged with respect to optical axes of light engines 807a, 807b respectively, such that emitters comprising light engines 807a, 807b may emit light in the visible range that is projected by optics 810a, 801b into scene 803 to illuminate object 802 in the vehicle travel path 20. In some embodiments, optics 810a, 810b may comprise steerable micro-lens arrays, which can be provided separately to individual emitters or shared by groups of emitters to selectively project light onto particular objects 802 in the vehicle travel path or proximal thereto.

Figure 1B:
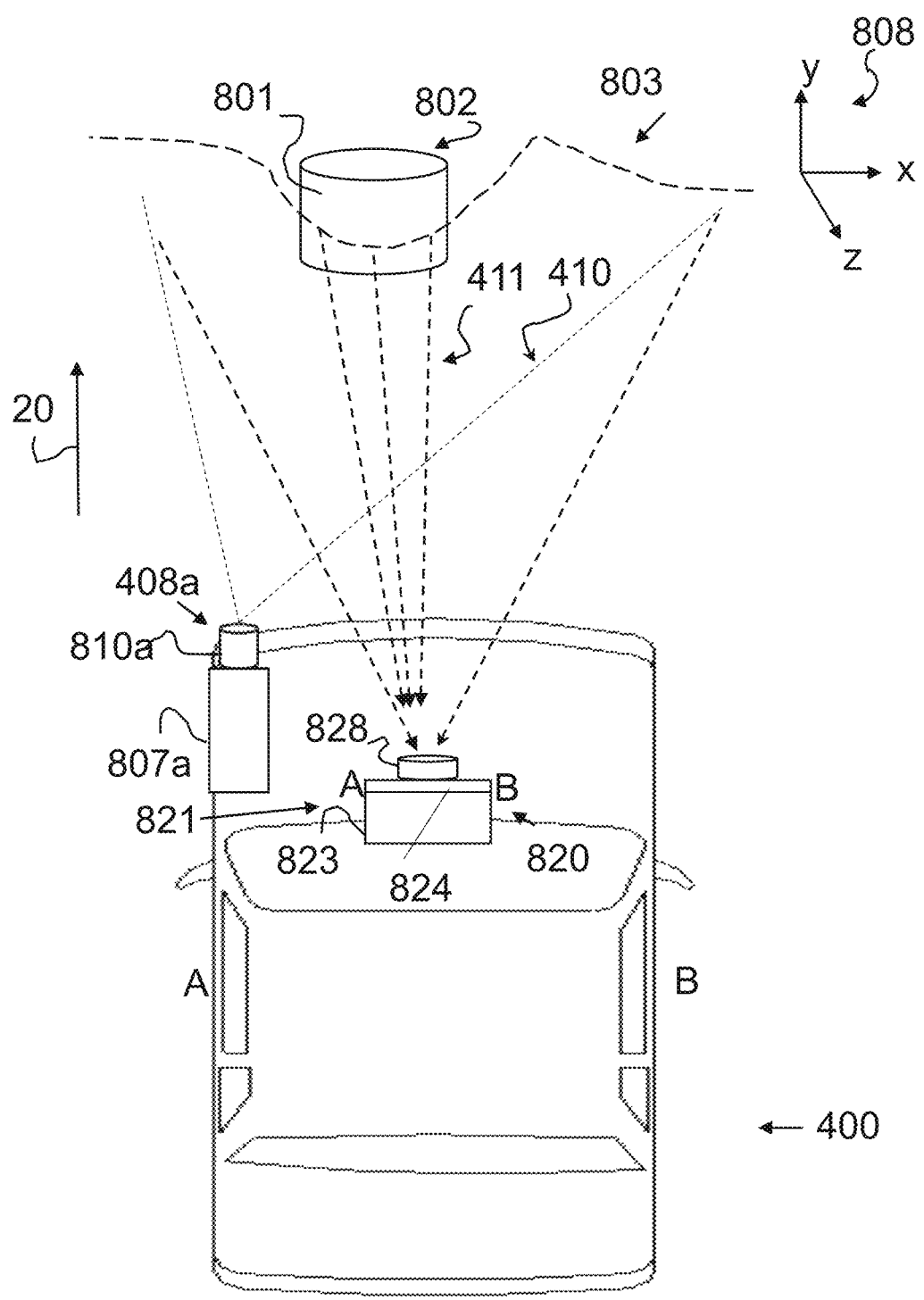
FIG. 1B is a pictorial illustration of another example vehicle vision system.

FIG. 1B is a pictorial diagram of an embodiment of a camera vision system 800 implemented in a vehicle 400. In the example illustrated in FIG. 1B, camera vision system 800 comprises first headlight 408a. First headlight 408a may comprise headlight optics 810a and first light engine 807a. System 800 may further comprise a camera 820, that may include an imager 821 and camera optics 828. Imager 821 may comprise a light sensing and measuring surface 824 and imager electronics 823. First headlight 408a may project visible light 410 generated by first light engine 807*a* into a travel path 20 of vehicle 400 so as to illuminate a real-world scene 803 including three-dimensional (3D) objects such as object 802. In addition, in some embodiments, the headlight 408*a* may also illuminate the roadway in the travel path 20. Although depicted as a headlight in the example embodiment depicted in FIG. 1B, in other embodiments, the headlight 408A may be a turn signal indicator light.

Object 802 can be defined by a 3D surface geometry 801, which can be expressed in terms of x, y, and z coordinates 808, where x extends horizontally, y extends vertically perpendicular to a path ground plane, and z extends in a direction from surface 801 to camera 820. First light engine 807*a* may be controlled by a controller (not visible in FIG. 1B) to generate first and second patterned light (as illustrated in FIG. 2). Headlight optics 810*a* may project the first patterned light into travel path 10 to illuminate at least portions of scene 803.

Camera 820 may be disposed in vehicle 400. In the example illustrated in FIG. 1B, the camera is positioned laterally with respect to first headlight 408*a* so that light sensing and measuring surface 824 can sense visible light 411 comprising reflections of the first and second patterned light from a surface 801 of object 802. For example, camera 820 can be disposed in, attached or secured to a grille, dashboard, windshield, hood or roof of vehicle 400. Regardless of where camera 820 is positioned in or on vehicle 400, camera 820 may be arranged with respect to headlight 408*a* so that light sensing and measurement surface 824 of camera 820 is in a path of light 411 reflected from at least some portion of a surface 801 of at least one object 802 illuminated by light 410 emitted by headlight 408*a*. Camera 820 captures images of object 802 under the control of imager electronics 823 in response to capture control signals.

Optics 810*a* may include one or more light guides (not shown in FIG. 1B). The one or more light guides can be edge lit or may have an interior opening that defines an interior edge of the light guide. Light engine 807*a* may be disposed in interior openings of the one or more light guides such that they may inject light into the interior edge (interior opening light guide) or exterior edge (edge lit light guide) of the one or more light guides. In embodiments, the one or more light guides may further shape the patterned light emitted by light engines 807*a*, in accordance with, for example, a gradient, a chamfered distribution, a narrow distribution, a wide distribution, or an angular distribution so as to project light 410 to optimize illumination of travel path 20 in accordance with various design considerations or constraints.

In the embodiment shown in FIG. 1B, optical axes of optics 810*a* may be arranged with respect to optical axes of light engines 807*a* such that emitters comprising light engines 807*a* may emit light in the visible range that is projected by optics 810*a* into scene 803 to illuminate object 802 in the vehicle travel path 20. In some embodiments, optics 810*a* may comprise steerable micro-lens arrays, which can be provided separately to individual emitters or shared by groups of emitters to selectively project light onto particular objects 802 in the vehicle travel path or proximal thereto.

FIG. 1C is a pictorial diagram of an embodiment of a camera vision system 800 implemented in a vehicle 400. In the example illustrated in FIG. 1C, camera vision system 800 comprises first and second tail lights 110*a*, 110*b*. First and second tail lights 110*a*, 110*b* may each comprise headlight optics 110*a*, 810*b* respectively, and first and second light engines 807*a*, 807*b*, respectively. The embodiment depicted in FIG. 1C may operate in a similar manner as FIG. 1A. However, the vision system 800 may be adapted to reconstruct the surface geometry of object 802 and/or determine the distance to the object 802 where the object 802 is located behind the vehicle. This configuration may be particularly useful in autonomous driving applications such as autonomous parking.

Figure 1D:
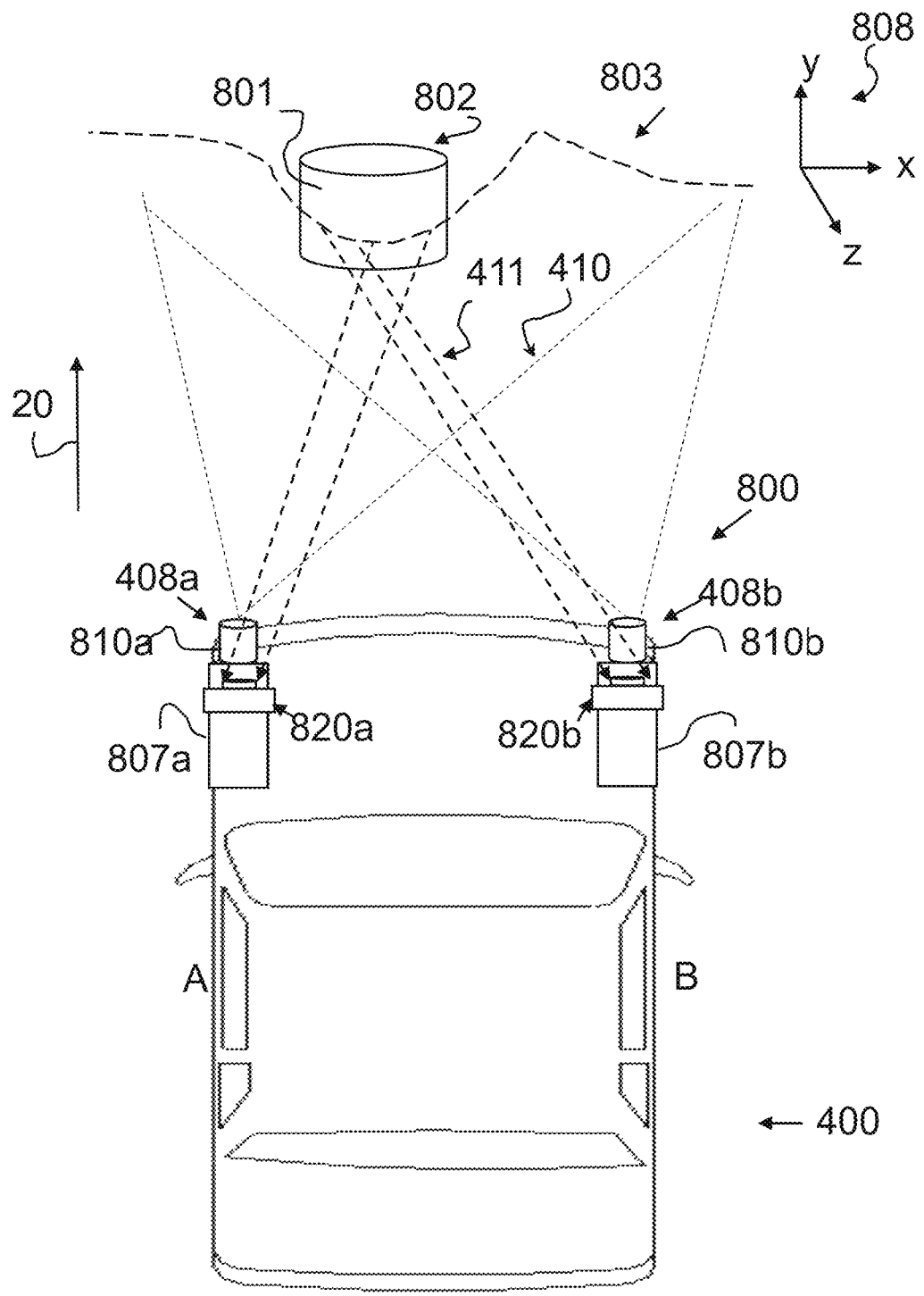
FIG. 1D is a pictorial illustration of another vehicle vision system.

FIG. 1D is a pictorial diagram of an embodiment of a camera vision system 800 implemented in a vehicle 400. In the example illustrated in FIG. 1D, camera vision system 800 is similar to the example illustrated in FIG. 1A. However, the camera 820 may be integrated into the headlight 408A and 408B, respectively. In this embodiment, the camera 820A may capture an image of the patterned light projected by headlight 408B, and the camera 820*b* may capture an image of the patterned light projected by headlight 408A. Using this reversed configuration of the A camera capturing the B projection and vice versa may enable the vision system 800 to maximize the distortion of the light projected on the object 802 and thereby improve the reconstruction of the surface geometry of the object 802 and/or determining the distance away from the object 802. The patterns of light projected by the headlight 408A and 408B may be different patterns that may be selected so that the pattern from headlight 408*a* is easily distinguishable from 408B. For example, the headlight 408A may project a pattern that includes a red light, and the headlight 408B may project a pattern using a blue light. In these cases, the respective cameras 820A and 820B may be adapted to filter out the pattern of the other headlight.

FIG. 2 is a high-level functional block diagram of an example embodiment of the vehicle vision system 800 illustrated in FIG. 1A. In the example of FIG. 2, headlights 408*a* and 408*b* include light engines that comprise first and second hybridized devices 102*a*, 102*b* respectively. An example of a hybridized device 102*a* and 102*b* is illustrated in FIG. 4B First and second optics 810*a* and 810*b* can each include a reflector 860*a*, 860*b* and one or more lenses 861*a*, 861*b*, that may comprise first and second arrays of steerable micro-lenses in some example embodiments. First and second optics 810*a*, 810*b* may include more optical components than depicted, and/or different optical components than depicted, depending on implementation.

Figure 12:
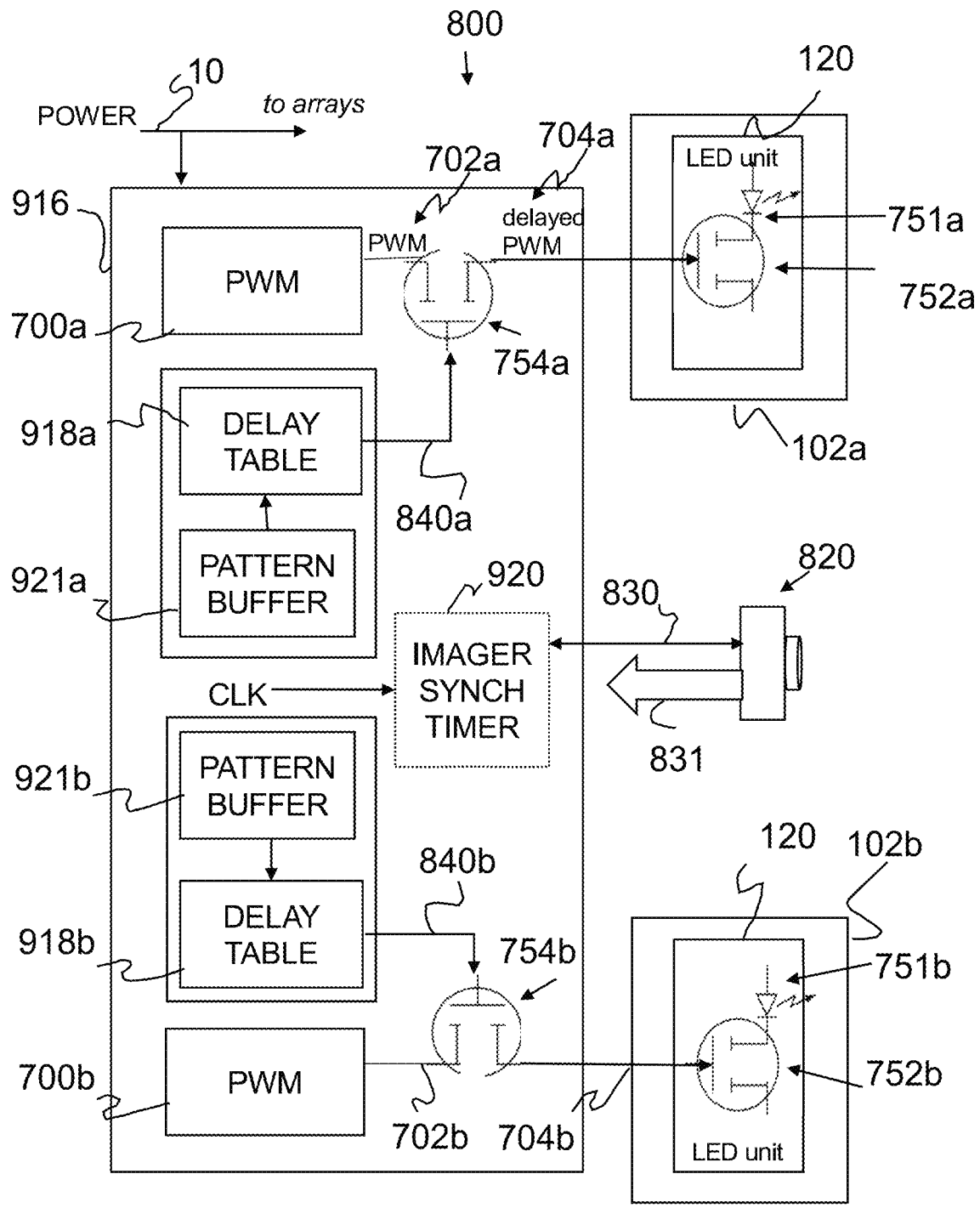
FIG. 12 is a functional block diagram of a system according to an embodiment described herein.
Figure 13:
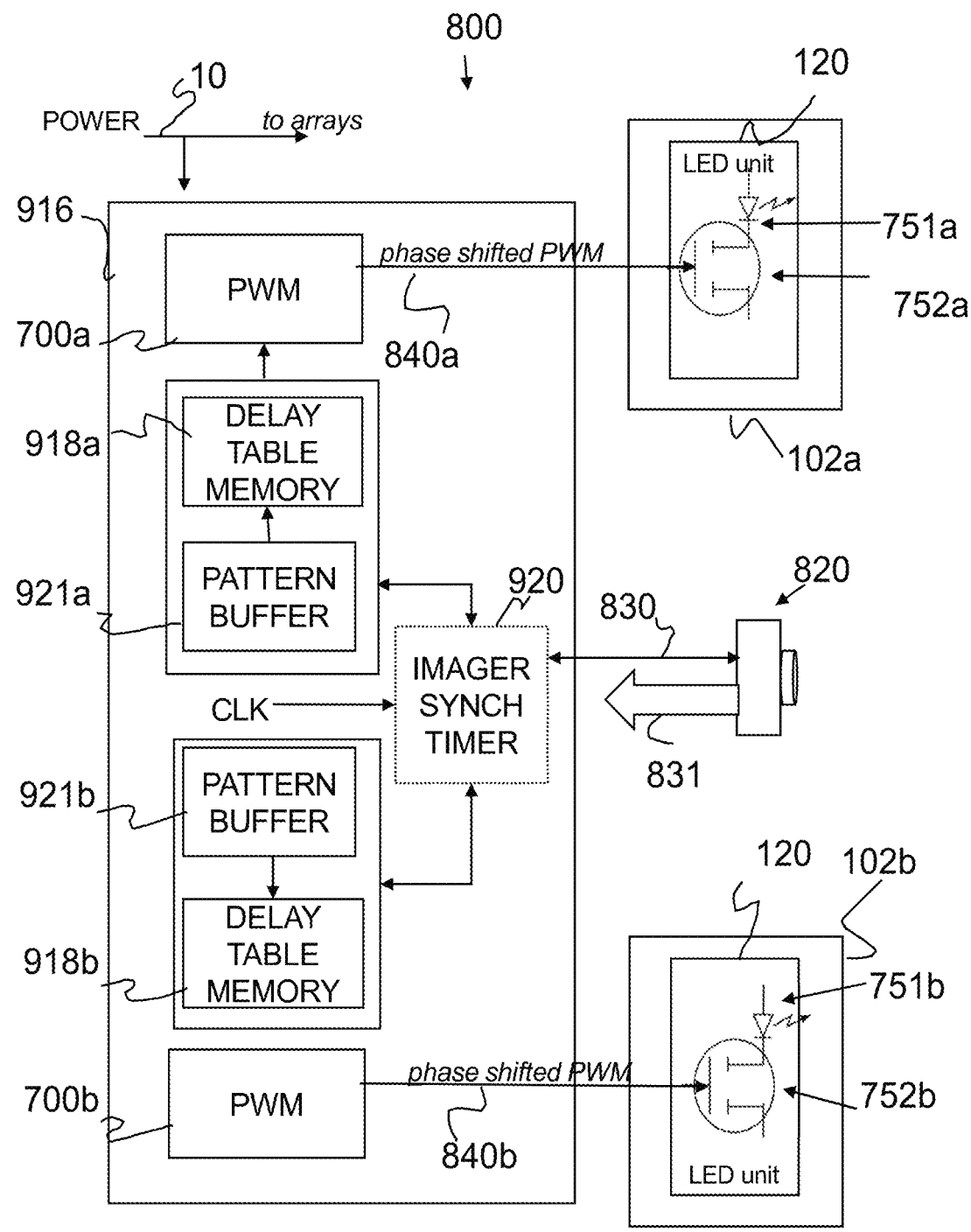
FIG. 13 is a functional block diagram of a system according to an embodiment described herein.

Controller 916 may provide control signals 840*a*, 840*b* to hybridized devices 102*a*, 102*b*, respectively. An example embodiment of the controller 916 is depicted in FIGS. 12 and 13. In some instances, the controller 916 may provide the control signals 840*a*, 840*b* to hybridized devices 102*a*, 102*b* in response to a signal 212 that may be received from additional systems within the vehicle. Control signals 840*a*, 840*b* may select LEDs comprising the first and second arrays 102*a*, 102*b* to be driven in the ON state so first and second arrays 102*a*, 102*b* may emit light in a pattern defined by an arrangement of ON and OFF LEDs. The patterned light may be projected by optics 810*a*, 810*b* of headlights 408*a*, 408*b*, thereby forming a first and second patterned light 817*a*, 817*b*. Patterned light 817*a*, 817*b* may be projected into the travel path 20 of vehicle 400, where they may be reflected from surfaces of objects in the path.

In the example of FIG. 2, a first patterned light 817*a* is shown to be reflected from a 3D surface 801 of an object 802. As seen from the perspective of camera 820, stripes of light comprising patterned light 817*a* appear wavy. For purposes of illustration, a dark stripe in the drawing figures corresponds to a group of light emitting elements that are ON (e.g., emitting light) and arranged with respect to light emitting elements that are OFF (e.g., not emitting light).

Light elements that are not emitting light are illustrated as colorless (white) in the drawing figures.

The contrast between OFF elements and ON elements may create an edge that corresponds to the shape of a stripe (e.g., an elongated, generally rectangular strip of light). The waves in the stripes seen from the perspective of camera 820 may correspond to the surface shape of surface 801. Likewise, stripes of light comprising patterned light 817*b* may appear wavy in accordance with the surface shape of surface 801. Camera 820 may capture images of the object in which the patterned light 817*a*, 817*b* may curve in accordance with the surface shape of the object.

In some instances, controller 916 may send capture signals 830*a* to camera 820. In response to the capture signals, imager electronics 823 may read the measurements of light reflected from the surface 801 of the object 803 onto light sensing and measurement surface 824, thereby capturing an image of object 803. Camera 820 may provide the captured image of the object to an image processor (not shown), which can be part of controller 916 or can be an external image processor (not shown). The image processor may reconstruct the surface geometry of object 802 and/or determine the distance away from the object 802 based on the distortion in the first and second captured images.

In other instances, controller 916 may receive capture signals 830*a* from the camera 820. In response to the capture signals, controller 916 may cause the hybridized devices 102*a* and 102*b* to project the patterned light onto the object 802. Camera 820 may then capture an image of the object with the patterned light projected onto it. The camera 820 may provide the captured image of the object to an image processor (not shown), which can be part of controller 916 or can be an external image processor (not shown). The image processor may reconstruct the surface geometry of object 802 and/or determine the distance away from the object 802 based on the distortion in the first and second captured images. The image processor may then provide the reconstructed surface geometry of object 802 and/or determined distance away from the object 802 to car systems 210 directly via 831*b* or indirectly via 831*a*. The car systems 210 may include Electronic Control Units (ECUs), processors or circuits of the vehicle 400 that control autonomous driving, Advanced Driver-Assistance System (ADAS), navigation systems, or illumination systems The car systems 210 may provide the camera 820 and the controller 916 with the capture signal via signals 830*b* and 212. In these instances, the controller may receive the signal 212, and in response to receiving the capture signals, controller 916 may cause the hybridized devices 102*a* and 102*b* to project the patterned light onto the object 802. Camera 820 may then capture an image of the object with the patterned light projected onto it. The camera 820 may provide the captured image of the object to an image processor (not shown). The image processor may reconstruct the surface geometry of object 802 and/or determine the distance away from the object 802 based on the distortion in the first and second captured images. The image processor may then provide the reconstructed surface geometry of object 802 and/or determined distance away from the object 802 directly to car systems 210 via 831*b* or indirectly via 831*a*.

The image processor may implement one or more of the imaging techniques described in "Structured-light 3D surface imaging: a tutorial" (Jason Geng, "Structured-light 3D surface imaging: a tutorial," Adv. Opt. Photon. 3, 128-160 (2011)) to reconstruct the surface geometry of object 802 and/or determine the distance away from the object 802. "Structured-light 3D surface imaging: a tutorial" is hereby incorporated by reference in its entirety.

The car system 210 may detect that either headlight 408*a* or 408*b* is not operating properly. The headlight may be operating improperly due to a respective headlight being occluded by debris, damaged in an accident, an electrical anomaly, insect strikes, or a failure of the respective LED array. In this instance, the car system may dynamically reconfigure itself to operate in accordance with the embodiment depicted in FIG. 1B. The car system 210 may determine that either headlight 408*a* or 408*b* is not operating properly by comparing images captured by the camera 820 of the projections of the patterned light 817*a*, 817*b*.

In some instances, the car system 210 may perform a calibration of the vehicle vision system 800. In the calibration procedure, the car system 210 may cause the headlights 408*a*, 408*b* to project the patterned light 817*a*, 817*b* onto an object 802 at one or more predetermined distance from the camera 820. The car system 210 may then instruct the camera 820 to capture an image of the patterned light 817*a*, 817*b* projected onto an object 802 at each of the one or more predetermined distances. The image processor may then use the images to calibrate the image processor to accurately measure the distance to the object. In some instances, the calibration is repeated for different patterns of light.

The particular patterned light 817*a*, 817*b* may define light patterns chosen to facilitate the description of the example embodiments. However, persons of ordinary skill reading the description will appreciate a wide variety of light patterns that may be suitable for implementing the various embodiments of vehicle vision system 800 described herein.

Figure 3A:
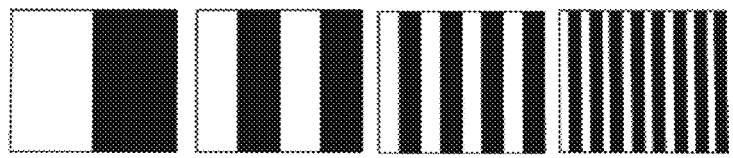
FIG. 3A is a pictorial illustration depicting examples of light patterns suitable for implementing embodiments described herein.
Figure 3A:
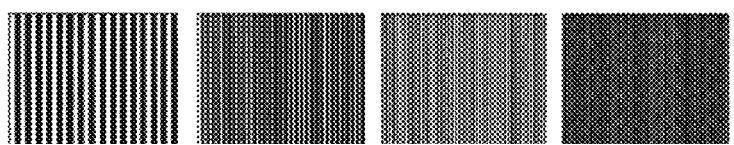
Figure 3A:
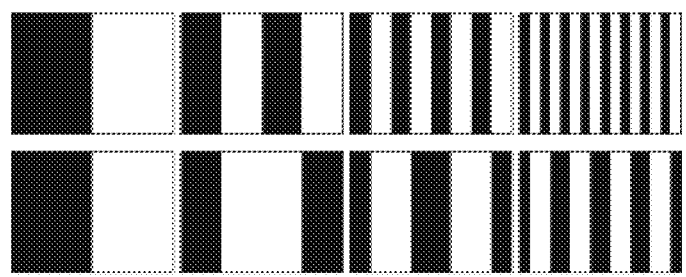

FIG. 3A illustrates some examples of alternative light patterns suitable to implement patterned light 817*a*, 817*b* in various embodiments described herein. However, these examples are not exhaustive of the full range of light patterns suitable for implementing the described embodiments. Similar to FIG. 2, and for purposes of illustration, a dark stripe in the drawing figures corresponds to a group of light emitting elements that are ON (e.g., emitting light) and arranged with respect to light emitting elements that are OFF (e.g., not emitting light). Light elements that are not emitting light are illustrated as colorless (white) in the drawing figures. In some instances, the patterned light 817*a*, 817*b* may include lights of different colors. In other instances, the patterned light 817*a*, 817*b* may include continuously varying colors of light. In yet other instances, the patterned light 817*a*, 817*b* may include color-coded stripes, segmented stripes, and a De Bruijn Sequence. In some instances, the patterned light 817*a*, 817*b* may include pseudo-random binary dots, mini-patterns, color-coded grids, or color-coded dot arrays.

The selection of a particular patterned light may influence a size of a feature of the surface geometry of imaged objects that may be detected by the camera 820 and the image processor. In addition, the selection of a particular patterned light may influence the accuracy of the measurement of the distance to the object. For example, a grid pattern with more horizontal and vertical lines may allow for small feature sizes to be detected and more accurate measurements of a distance than a pattern with fewer horizontal and vertical lines. As a result, in many instances, it may be desirable to use μLEDs to project the patterned light because of μLEDs' small pixel sizes and the ability to generate high contrast projections. The μLEDs small pixel sizes and the ability to generate high contrast projections may, therefore, result in high accuracy distance measurements and small feature size detection.

The particular pattern may be selected based on the number of headlights utilized in the system 800. For example, a two-headlight system, as depicted in FIG. 1A, may utilize a particular pattern that is optimized based on the projection of two patterns. Similarly, in a single headlight system, as depicted in FIG. 1B, a different pattern may be selected that is optimized for a single headlight. Likewise, in embodiments where more than two headlights are used, the pattern may be optimized for the number of headlights used in the system. In other embodiments, the pattern of light may be selected based on whether the system 800 is installed in a headlight configuration such as depicted in FIG. 1A/1B or a taillight configuration as depicted in FIG. 1C. For example, in the tail light configuration, a pattern may be selected that is optimized to be compatible with the red color projected by the tail lights during night driving or when the breaks of the vehicle are applied.

In some instances, the particular pattern may be selected to support multi-shot 3D surface imaging. In these configurations, a particular pattern in a first time period may be changed to a different pattern in a second time period. This may enable the image processor to reconstruct the surface geometry of the object 802 and/or determine the distance away from the object 802 based on images of the projection of the different patterned light in the first and second time periods.

In some instances, the particular pattern of the patterned light 817a, 817b may be dynamically reconfigurable by the controller 916 or car systems 210. In some instances, the selection of the particular pattern may be automatically determined.

Figure 3B:
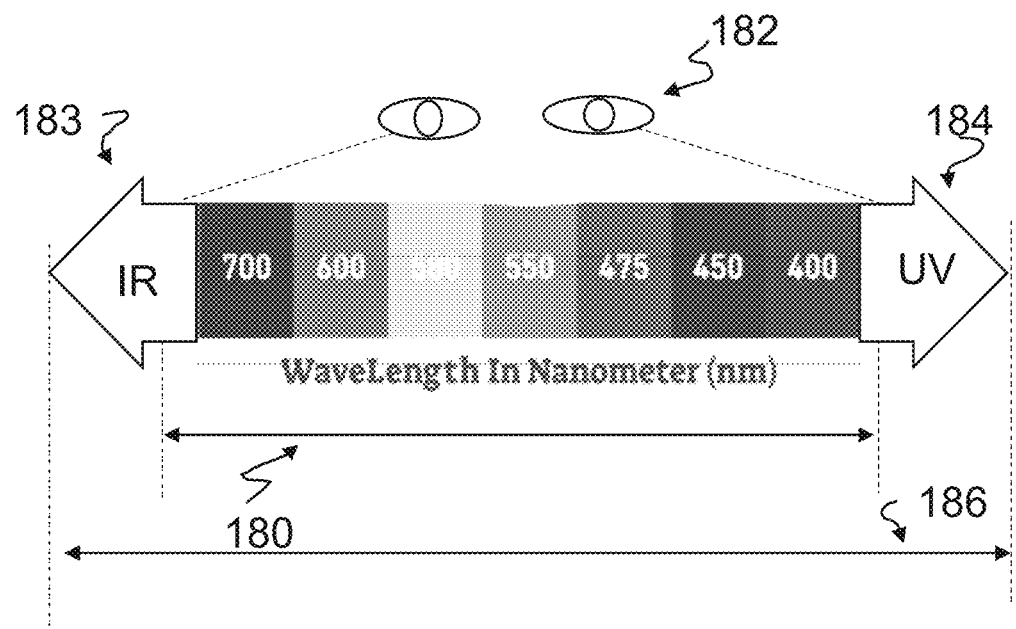
FIG. 3B is a diagram of visible light portions of the electromagnetic spectrum.

FIG. 3B is a chart illustrating the electromagnetic spectrum 186. In embodiments described herein, emitters comprising arrays 102a, 102b (shown in FIG. 2) may emit light in a visible portion 180 of electromagnetic spectrum 186. Visible portion 180 of spectrum 186 may be defined by radiation at wavelengths from about 380 nm and up to about 780 nm and even into an extended range up to about 830 nm. In some implementations, emitters comprising arrays 102a, 102b may be LEDs that emit white light by combining a blue-emitting LED die and a phosphor coating or layer. In operation, blue radiation from the emitters comprising arrays 102a, 102b may excite the phosphor causing the phosphor to re-emit part of the excitation energy as longer wavelength light spreads over a broad spectrum. The converted luminescence from the phosphor, together with unconverted blue light from the LED, can provide light in the white portion of the spectrum.

In some example embodiments, arrays 102a, 102b may include LED chips, which can have sizes of about 1-2 mm or less and can typically deliver a maximum luminous flux of about 200 Lm. With high-power LED technology, luminance levels of about 100 to 200 MCd/m2 can be emitted by arrays 102a, 102b in some embodiments.

In some example embodiments, the patterned light 817a, 817b may be projected in the non-visible spectrums of either IR 183 or UV 184. In these embodiments, the camera 820 may be adapted to capture images in the same non-visible spectrum as the patterned light. By using the non-visible spectrum, the patterned light 817a, 817b can be projected onto the particular objects 802 without potentially distracting the driver. In addition, by using the non-visible spectrum, the problem where the patterned light 817a, 817b is the same color as the particular objects 802 may be more often avoided.

In other example embodiments, the patterned light 817a, 817b may be projected in the non-visible spectrums of either IR 183 or UV 184, and the hybridized devices 102a, 102b may project light on the roadway in the visible spectrum 182. In these embodiments, the camera 820 may be adapted to capture images in the same non-visible spectrum as the patterned light. These embodiments may enable the driver of the vehicle to have a visibly illuminated roadway while at the same time providing the patterned light 817a, 817b needed by the camera.

In additional example embodiments, the patterned light 817a, 817b may be projected in a first color, and the hybridized devices 102a, 102b may project light on the roadway in a second color. For example, the first color and the second color may be selected so that when combined, the resulting light on the roadway appears as white light. For instance, the first color may be yellow and the second color blue. In these embodiments, the camera 820 may be adapted to capture images only in the wavelength that corresponds to first color. These embodiments may enable the patterned light to be projected for a longer duration without being distracting to the driver.

Figure 4A:
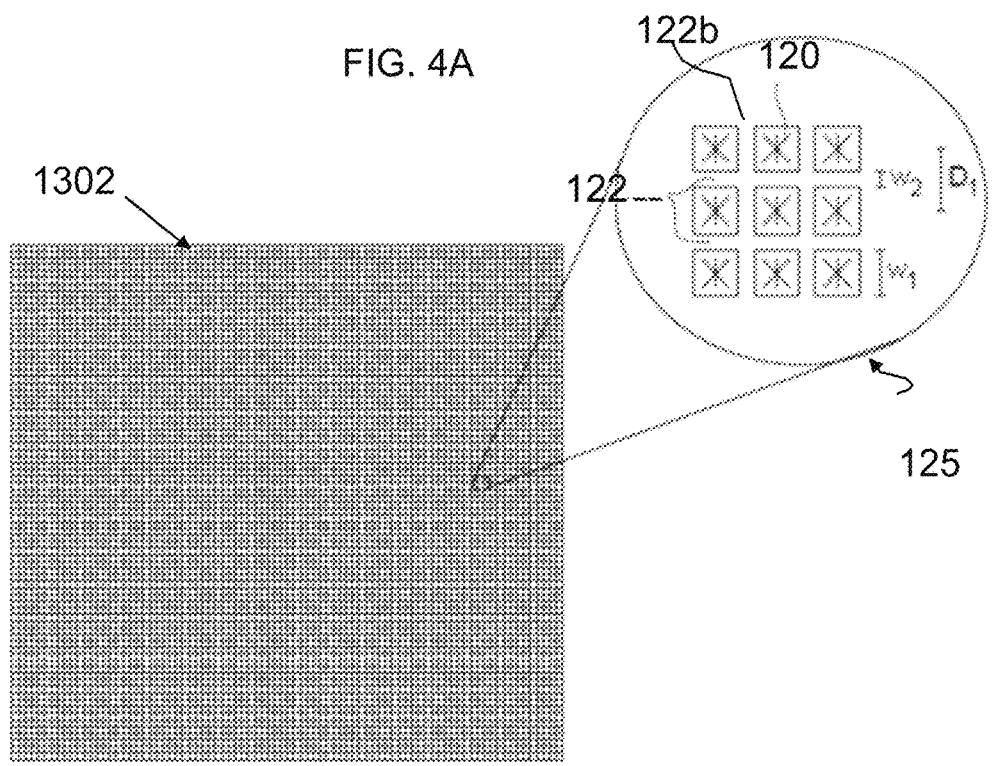
FIG. 4A is a top plan view of an example array suitable for implementing embodiments described herein.
Figure 4B:
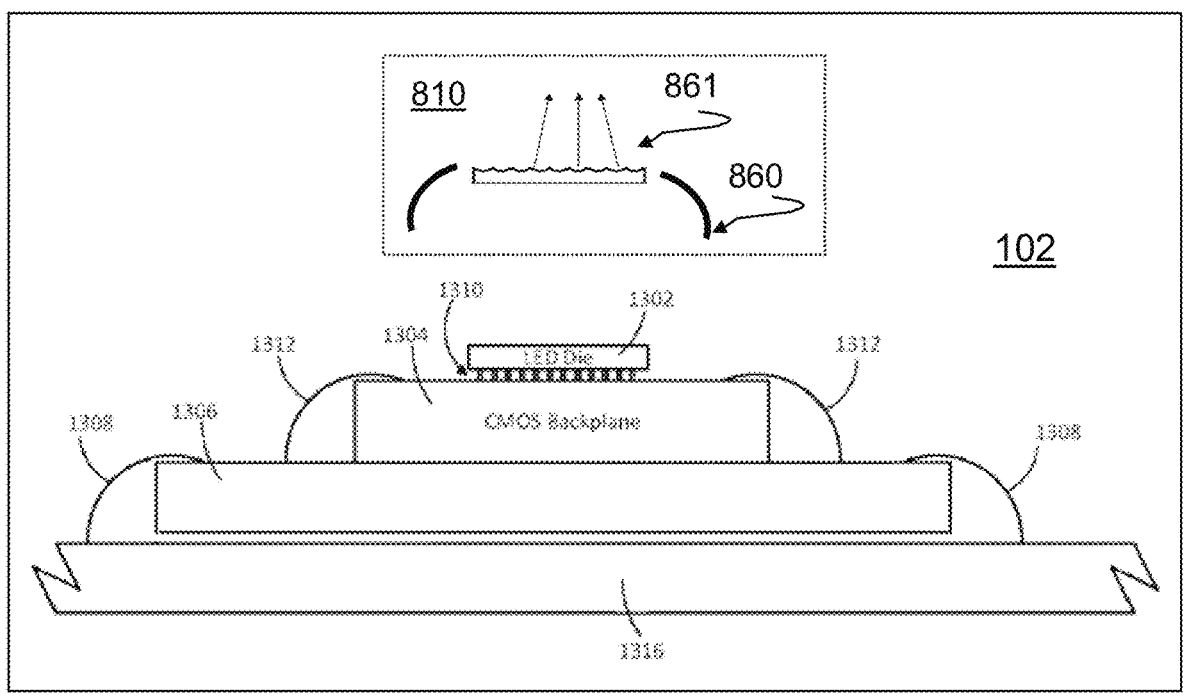
FIG. 4B is a side elevation view of an example hybridized device suitable for implementing embodiments described herein.

FIG. 4A is a top view of an example hybridized device. The example hybridized device illustrated in FIG. 4A includes an LED die 1302 that includes light emitting elements 120 (also referred to herein as emitters). Projected patterned light 817a, 817b (shown in FIG. 2) may define images that may include light emitted from LEDs 120. In the context of system 800, each LED 120 (or group of LEDs) of the array can correspond to a projector picture element or projector pixel. In embodiments described herein, emitters 120 may comprise light emitting diodes (LEDs). Suitable hybridized devices may include monolithic LED arrays, micro LED arrays, etc. Each LED 120 in LED die 1302 may be individually addressable. Alternatively, groups or subsets of LEDs 120 may be addressable. In embodiments described herein, array 102 may be a micro LED whereby, for example, each LED 120 may have a size in the range of micrometers (i.e., between 1 micrometer ($\mu m$) and 100 $\mu m$). For example, LED 120 may have dimensions of approximately (within 10 $\mu m$ by 10 $\mu m$) 40 $\mu m$ by 40 $\mu m$ in some embodiments. An LED 120 may have a lateral dimension of less than 100 $\mu m$ in some embodiments.

LEDs 120 may be arranged as a matrix comprising one or more rows and one or more columns to define a rectangle. In other embodiments, LEDs 120 may be arranged to define other shapes. Each micro-LED included in the LED die 1302 may encompass thousands or millions of projector pixels or LEDs. For example, a $\mu LED$ may include approximately (e.g., within 5,000 pixels, 20,000 pixels or more—such as millions of pixels). Each pixel may include an emitter. A $\mu LED$ can support high-density pixels having a lateral dimension less than 150 $\mu m$ by 150 $\mu m$. In some embodiments, a $\mu LED$ die 1302 can have dimensions of about 50 $\mu m$ in diameter or width. In some embodiments, the height dimension of an array 120 including the LEDs, their supporting substrate and electrical traces, and associated micro-optics may be less than 5 millimeters.

An exploded view of a 3×3 sub-array 125 of emitters 120 included in LED die 1302 is also shown in FIG. 4A. Subarray 125 may include emitters 120, each defined by a width $w_1$. In some example embodiments, width $w_1$ can be approximately 100 $\mu m$ or less (e.g., 40 $\mu m$). As shown in the sub-array 125, lanes 122 may be defined extending horizontally and vertically to define rows 122a and columns 122b of LEDs 120. Lanes 122 between the emitters 120 may be a width, $w_2$, wide. In embodiments, the width $w_2$ may be approximately 20 $\mu m$ or less (e.g., 5 $\mu m$). In some embodiments, the width $w_2$ may be as small as 1 $\mu m$. The lanes 122 may provide an air gap between adjacent emitters or may contain other material. A distance d1 from the center of one emitter 120 to the center of an adjacent emitter 120 may be approximately 120 μm or less (e.g., 45 μm). It will be understood that the widths and distances provided herein are examples of one of many possible embodiments in which widths and/or other dimensions may vary.

In some example embodiments, lanes 122 may be defined by a width $w_2$ that can be approximately 20 μm or less (e.g., 5 μm). In some example embodiments, width $w_2$ can be as small as 1 μm. Lanes 122 can serve to provide an air gap between adjacent emitters 120 and may contain material other than light emitting material. In some example embodiments, a distance $D_1$ from the center of one emitter 120 to the center of an adjacent emitter 120 can be approximately 120 μm or less (e.g., 45 μm). It will be understood that the LED and lane widths and distances between LEDs are intended as examples. Persons of ordinary skill reading the disclosure herein will appreciate a range of widths and/or dimensions will be suitable for various implementations, and those embodiments will fall within the scope of the disclosure.

For the convenience of illustration, emitters 120 that are included in the LED die 1302 are depicted herein as having a rectangular shape. However, as persons of ordinary skill will appreciate, a variety of other emitter shapes would be suitable for implementing the emitters 120 and LED die 1302 in various applications, and those would fall within the scope of the embodiments described herein. Likewise, LED die 1302 is depicted in FIG. 4A as a symmetric matrix of emitters 120. However, various other implementations of the LED die 1302 may be suitable for implementing embodiments described herein, depending on application and design considerations. For example, in some implementations, LED die 1302 can comprise a linear array of emitters 120, and in other implementations a rectangular array of emitters 120. In some implementations, the LED die 1302 can comprise a symmetric or asymmetric matrix of emitters 120. LED die 1302 can comprise an array or matrix defined by a dimension or order that differs from the array dimensions or orders depicted herein.

For example, in some practical applications, the LED die 1302 depicted in FIG. 4A may include over 20,000 emitters 120 in asymmetric or symmetric arrangements in a wide range of array dimensions and orders (e.g., a 200×100 array, a symmetric matrix, or a non-symmetric matrix). For example, in some practical applications, two or more LED dies 1302 can be stacked such that emitters 102 are arranged to define rows and columns that extend in three spatial directions or dimensions. It will also be understood that the LED die 1302 can itself be a subarray of a larger array (not shown) of emitters 102.

LED die 1302 may have a surface area of 90 mm2 or greater and may require significant power to drive the LED. In some applications, this can be as much as 60 watts or more. In some embodiments, the array 102 may include an array of emitters. In that case, the LED die 1302 may include hundreds, thousands, or even millions of LEDs or emitters arranged within a centimeter-scale area substrate or smaller. A micro LED may include an array of individual emitters provided on a substrate or may be a single silicon wafer or die partially or fully divided into light-emitting segments that form the emitters 120. In some embodiments, the emitters may have distinct non-white colors. For example, at least four of the emitters may be RGBY groupings of emitters.

FIG. 4B illustrates an embodiment of a hybridized device 102. In this example embodiment, LED die 1302 contains the emitters 120. The Backplane 1304 may provide an electrical interface between individual emitters 120 or groups of emitters and other components, such as drivers and controllers that may determine which LEDs 120 will be ON (illuminated) and at what intensity and which LEDs will be OFF (not emitting) at any given time. In some embodiments, the silicon backplane may include circuitry to receive power from one or more power sources and to distribute the power to other components on the backplane and to emitters 120 of the array 102.

The backplane may include circuitry to receive control signals from one or more controllers external to the backplane. The backplane may be electrically coupled to LEDs 120 of array 102 to be able to select individual LEDs or groups of LEDs for illumination at various levels of intensity in response to control signals from the one or more controllers. For example, the backplane may provide an interface between one or more sources of lighting and power control signals including LED drivers, etc., and the emitters 120 of the array 102 can be driven in accordance with the control signals. The control signals can include pulse width modulated (PWM) signals for controlling the intensity of light emitted by individual emitters of the array 102 to form light emission patterns for patterned light, such as patterned light 817a and 817b shown in FIG. 2.

The backplane 1304 may be further coupled to a circuit board 1306. The backplane 1304 may be coupled to the circuit board 1306 via top wires 1312. In other instances, the circuit board 1306 may be coupled to backplane 1304 via a socket. The circuit board 1306 may include additional circuitry and packaging for the hybridized device 102, such as drivers and heat sinks. In addition, the circuit board 1306 may include additional circuitry to facilitate communication with the controller 916 or the car systems 210. In some instances, the controller 916 may be integrated in the circuit board 1306. The circuit board 1306 may also be referred to as the packaging board to distinguish it from other circuit boards described herein.

A circuit board 1306 may be further coupled to a customer board 1316. The circuit board 1306 may be coupled to the customer board 1316 via top wires 1308. In other instances, the circuit board 1306 may be coupled to the customer board 1316 via a socket or through bottom connectors of the circuit board 1306. The customer board 1316 may include additional circuitry and/or packaging for the hybridized device 102, such as drivers, controllers, passive components and/or heat sinks. In addition, the customer board 1316 may include additional circuitry to facilitate communication with the controller 916 or the car systems 210. In some instances, the controller 916 may be integrated in the customer board 1316.

The hybridized device 102 may include optics 810, such as reflector 860 and/or one or more lenses 861. The optics 810 may include more optical components than depicted and/or different optical components than depicted, depending on the implementation. For example, in some instances, the optics 810 may include prisms and/or steerable microlenses required to project the patterned light generated by the LEDs on the LED die 1302 onto the object 802.

The silicon backplane may be a complementary metal-oxide-semiconductor (CMOS) backplane that may provide a number of LED drivers equal to the number of LEDs comprising a corresponding LED array. In some embodiments, one driver may be provided for each group of LEDs, each group comprising some number of LEDs. In those implementations, groups of LEDs or emitters may be controlled together rather than controlling individual LEDs. In some embodiments, the silicon backplane may be implemented by an application-specific integrated circuit (ASIC). Each driver may be electrically coupled individually to the corresponding LED or emitter or groups of LEDs or emitters.

In an embodiment of the backplane described above, individual drivers may be provided in the silicon backplane and electrically coupled to individual LEDs or emitters or groups of LEDs or emitters in the LED array. Accordingly, LED array 120 may be ideally arranged in close proximity to the silicon backplane. In embodiments, this may be accomplished by individually coupling copper pillar bumps or other connectors in an array of copper pillar bumps or connectors on a surface of the LED array to corresponding connectors on an opposing surface of the silicon backplane.

Additionally, an LED array, such as array 102, and the associated silicon backplane, may include a number of passive elements, such as resistors, capacitors, and crystals, to be disposed on one or more circuit boards that may be arranged in close proximity to the silicon backplane. Embodiments described herein may include array elements comprising LED packages or units that may enable mounting a large number of passive components (e.g., 27 or more) on a surface of a circuit board and in close proximity to the backplane and LED array. Further, embodiments described herein may provide a low profile LED array package that accommodates one or more passive elements and enables dissipation of heat generated by the silicon backplane and the LED array.

Figure 5A:
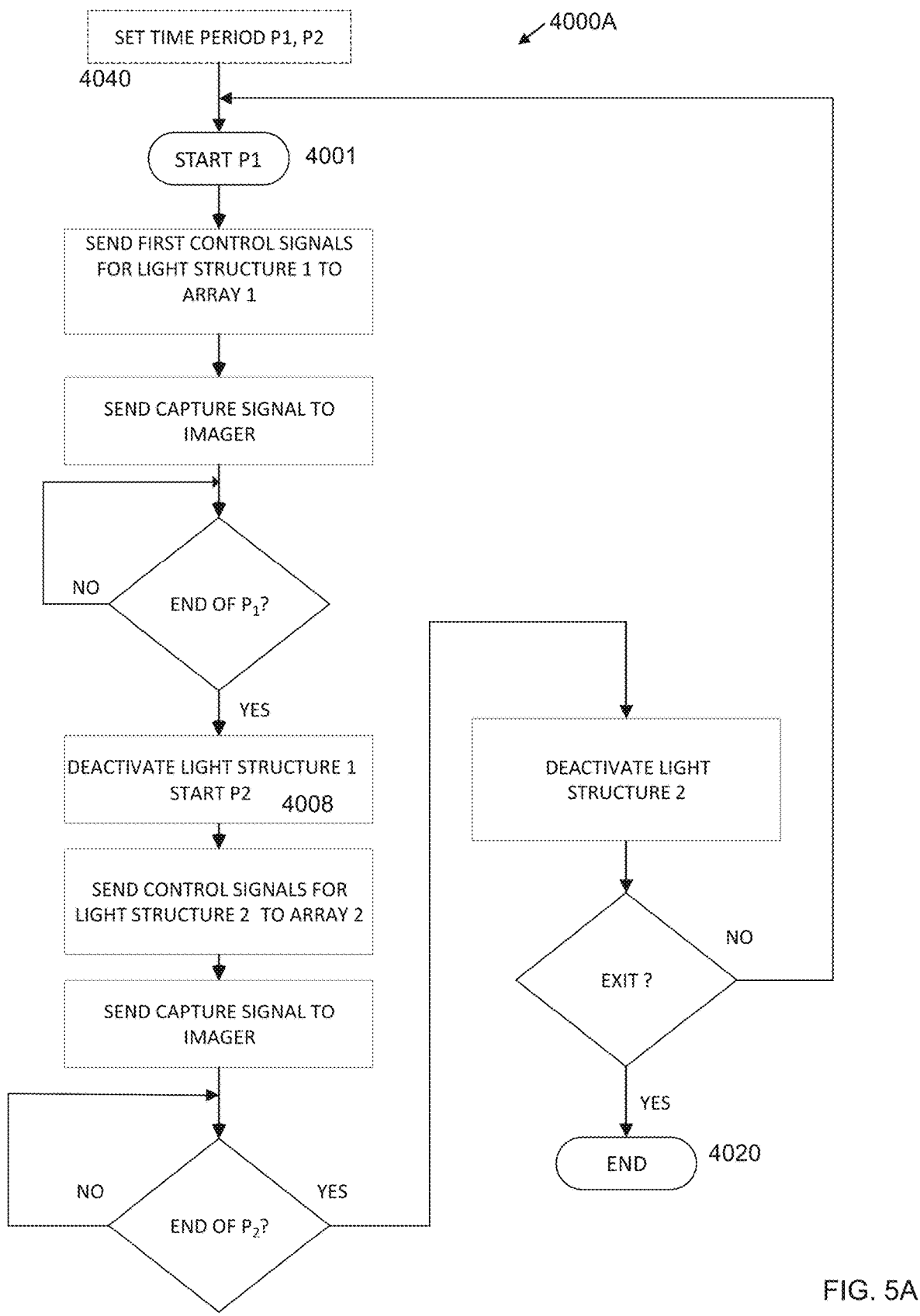
FIG. 5A is a flow diagram of an example method according to an example embodiment described herein.

FIG. 5A is a flow diagram of an example method 4000A that may be implemented via a controller, such as the controller 916, the auto system 212 and/or a controller anywhere on the packaging board 1306 or the customer board 1308 to cooperate with arrays 102a, 102b of headlights 408a, 408b and camera 820 to implement the vehicle vision system 800 according to an example embodiment that utilizes a multi-shot 3D surface imagining. The method 4000A may define a protocol or algorithm for configuring the controller and/or the auto system 212 to perform system functions described herein.

Before the method starts, time periods P1 and P2 may be defined. For example, time periods corresponding to P1 and P2 can be programmed in, provided to, or otherwise defined by a synchronization (synch) timer 920 (shown in FIG. 2). The method may start at 4001 by initiating synch timer 920 such that a time of performing step 4002 may mark the start time of P1. At 4002, controller 916 may send a first control signal 840a to select individual LEDs 120 of array 102a to be driven to their ON states, while other LEDs 120 of array 102a may be driven to their OFF states such that relative positions in array 102a of the LEDs may be in the ON state with respect to positions in array 102a of LEDs in the OFF state, which may define a light emission contrast pattern for array 102a.

In response to the first control signal 840a, and at some time after the start of P1 and before the expiration of P1, array 102a may switch LEDs ON and OFF in accordance with the light emission contrast pattern. With array 102a emitting light in accordance with the emission contrast pattern, optics 410a of headlight 408a may project the emission contrast pattern from array 102a into the travel path 10 of vehicle 400 as a first patterned light 817a. The projection of 817a can be maintained for some time thereafter.

At some time after headlight 408a projects patterned light 817a, and while patterned light 817a is projected into travel path 20, the controller may send a capture signal to camera 820 at 4004. In response to the capture signal, camera 820 may capture an image of a real-world scene in the travel path of the vehicle while the scene is illuminated by projected patterned light 817a so that the captured image includes a reflection of first patterned light 817a from a surface 801 of one or more objects 802 in scene 803.

At 4006, the expiration of P1 may be detected. In the event projected patterned light 817a is not deactivated at the expiration of P1, at 4008, the controller may send control signals to array 102a to deactivate the first projected patterned light 916a. At the same time, synch timer 920 may initiate a timer for P2.

At 4010, the controller may send second control signal 840b to array 102b comprising headlight 408b to select individual LEDs 120 of array 102b to be driven to their ON states while other LEDs 120 of array 102b may be driven to their OFF states such that relative positions in array 102b of the LEDs in the ON state with respect to positions in array 102b of LEDs in the OFF state may define a light emission contrast pattern for array 102b.

In response to the second control signal 840b, and at some time after the start of P2 and before the expiration of P2, array 102b may switch LEDs ON and OFF in accordance with the light emission contrast pattern for array 102b. With array 102b emitting light in accordance with the emission contrast pattern, optics 410b of headlight 408b may project the emission contrast pattern from array 102b into the travel path 10 of vehicle 400 as a second patterned light 817b. The projection of 817b can be maintained for some time thereafter.

At some time after headlight 408b projects patterned light 817b, and while patterned light 817b is projected into travel path 20, the controller may send a capture signal to camera 820 (4012). In response to the capture signal, camera 820 may capture an image of the real-world scene in the travel path of the vehicle while the scene is illuminated by projected patterned light 817b so that the captured image includes a reflection of second patterned light 817b from a surface 801 of one or more objects 802 in scene 803.

At 4014, the expiration of P2 may be detected. In the event projected patterned light 817b is not deactivated at the expiration of P2, at 4016, the controller may send control signals to array 102b to deactivate the second projected patterned light 916b. At 4018, an exit condition can be tested. If the exit condition is not met, the P1 timer may again be initiated at 4001, and the method may repeat until an exit condition is met at 4018, in which case the method may end at 4020.

Figure 5B:
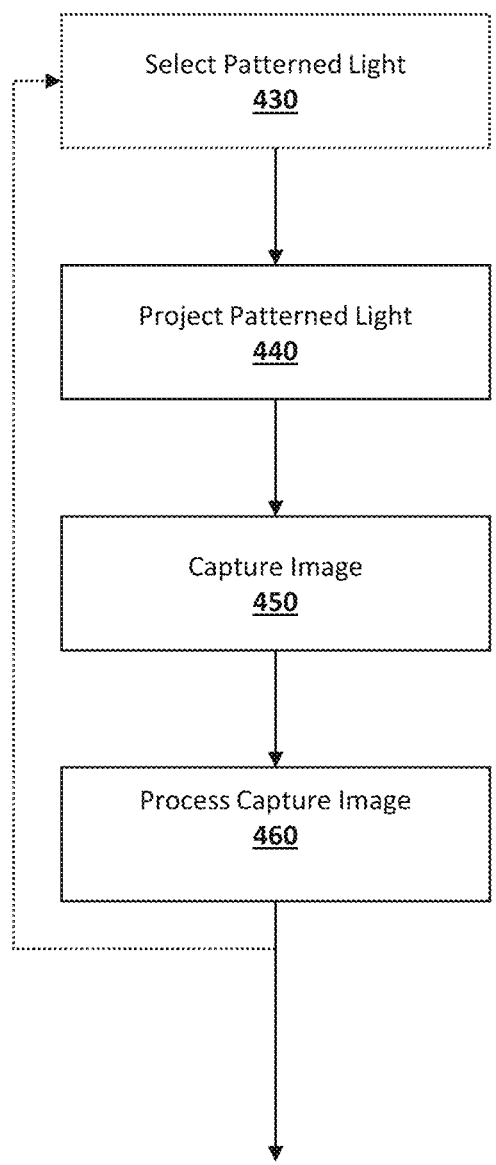
FIG. 5B is a flowchart of another example method according to an example embodiment described herein.

FIG. 5B is a flowchart of a method 4000B that may be implemented via the controller and/or the auto system 212 to cooperate with arrays 102a, 102b of headlights 408a, 408b and camera 820 to implement vehicle vision system 800 according to an example embodiment that utilizes a single shot 3D surface imagining. Method 4000B may define a protocol or algorithm for configuring the controller and/or the auto system 212 to perform system functions described herein.

In optional step 430, the controller 916 and/or the auto system 212 may select a pattern to be projected as one or more of the patterned light 817a, 817b. For example, the car systems 210 may determine that the car 400 is attempting to park and select a particular pattern that is optimized for detecting features of the object 802 at short distances. Similarly, in other embodiments, the car system may select a particular pattern when the adaptive cruise control is engaged. In this particular instance, the particular pattern may be optimized for detecting features of the object 802 at short distances. In other embodiments, the particular pattern may be selected by the time of day. For example, a particular pattern may be selected that is optimized for the lighting conditions to be found during dawn or dusk.

In other instances, the particular pattern may be selected in step 430 based on the ambient conditions outside the vehicle 400. For example, the car systems 210 may detect that it is raining either by a rain sensor or by engagement of the windshield wipers. In this instance, the car system 210 may select a particular pattern that minimizes the interference caused by the rain droplets on the projection of the patterned light 817a, 817b. In other instances, the car systems 210 may detect that it is likely that the vehicle 400 may encounter ice. In these instances, the pattern light selected may be optimized to detect ice. In other instances, the particular pattern of light may be selected based on the ambient light detected in the environment the vehicle 400 is traveling in. For example, if the car systems 210 determine that the vehicle 400 is in an environment with high sun glare, the particular pattern of light selected may be optimized so as to minimize the likely interference with the projection of the patterned light 817a, 817b.

In some embodiments, the particular pattern of the patterned light 817a, 817b may be selected in 430 based on the reconstructed surface geometry of object 802 and/or determined distance away from the object 802 determined in 460. For example, if the determined distance exceeds a threshold, the particular patterned light selected may be selected to be optimized for long distance objects. Similarly, if the determined distance is below a threshold, the particular pattern of light selected may be optimized for shorter distances. In other instances, the particular pattern may be selected based on the speed that the vehicle is traveling so that a different pattern is selected when the speed of the vehicle exceeds a threshold.

In yet other embodiments, the particular pattern of the patterned light 817a, 817b may be selected in 430 based on a condition that the image processor is unable to detect the patterned light in the captured image in step 460. For example, if the patterned light 817a, 817b is a blue light and the object 802 happens to be the same shade of blue, the camera 820 may be unable to detect the patterned light. Accordingly, a red light patterned light may be selected.

In other instances, the particular pattern of the patterned light 817a, 817b may be selected in 430 based on an input from the driver. In some instances, this may be done directly by turning a knob or making a selection in the vehicle. In other instances, the selection may be made indirectly by changing the driving mode. For example, selecting a sport driving mode may result in the selection of a patterned light that is optimized for higher speeds and faster object detection. Similarly, selecting Off Road may result in the selection of a patterned light that is optimized for slower speeds and multiple object detection. In other embodiments, a different pattern may be selected when the turn signals are activated. The pattern selected in these instances may be optimized for the detection of objects along the periphery of the field of view of the camera 820.

The patterned light 817a, 817b may be projected onto the roadway in the travel path 20 and the object 802 by hybridized devices 102a, 102b at 440. In some instances, additional light may also be projected onto the roadway surface that illuminates the roadway surface for the driver. In some instances, the patterned light 817a, 817b may be projected continuously in step 440. In other instances, the patterned light may be projected for a period of time that is less than the threshold of human perception (e.g. 20 ms)

In 450, an image of the projected patterned light 817a, 817b onto the roadway may be captured by the camera 820. In some instances, parameters of the camera may be modified based upon the pattern of light selected in step 430. For example, the integration time, exposure, aperture, or other parameters of the camera 820 may be configured based on the particular pattern selected.

The image processor may then reconstruct the surface geometry of object 802 and/or determine the distance away from the object 802 from the camera 820 in step 460. The image processor may reconstruct the surface geometry of the object 802 and/or determine the distance away from the object 802 from the camera 820 based on the image captured in 450. In some instances, the image processor may utilize additional information obtained during a calibration procedure to perform the reconstruction and/or determination. The results of the reconstruction and/or determination may then be provided to the car systems 210. Optionally, the results of the reconstruction and/or determination may also be provided to the controller 916 and/or the auto system 212 to select the particular pattern in 430.

Figure 6:
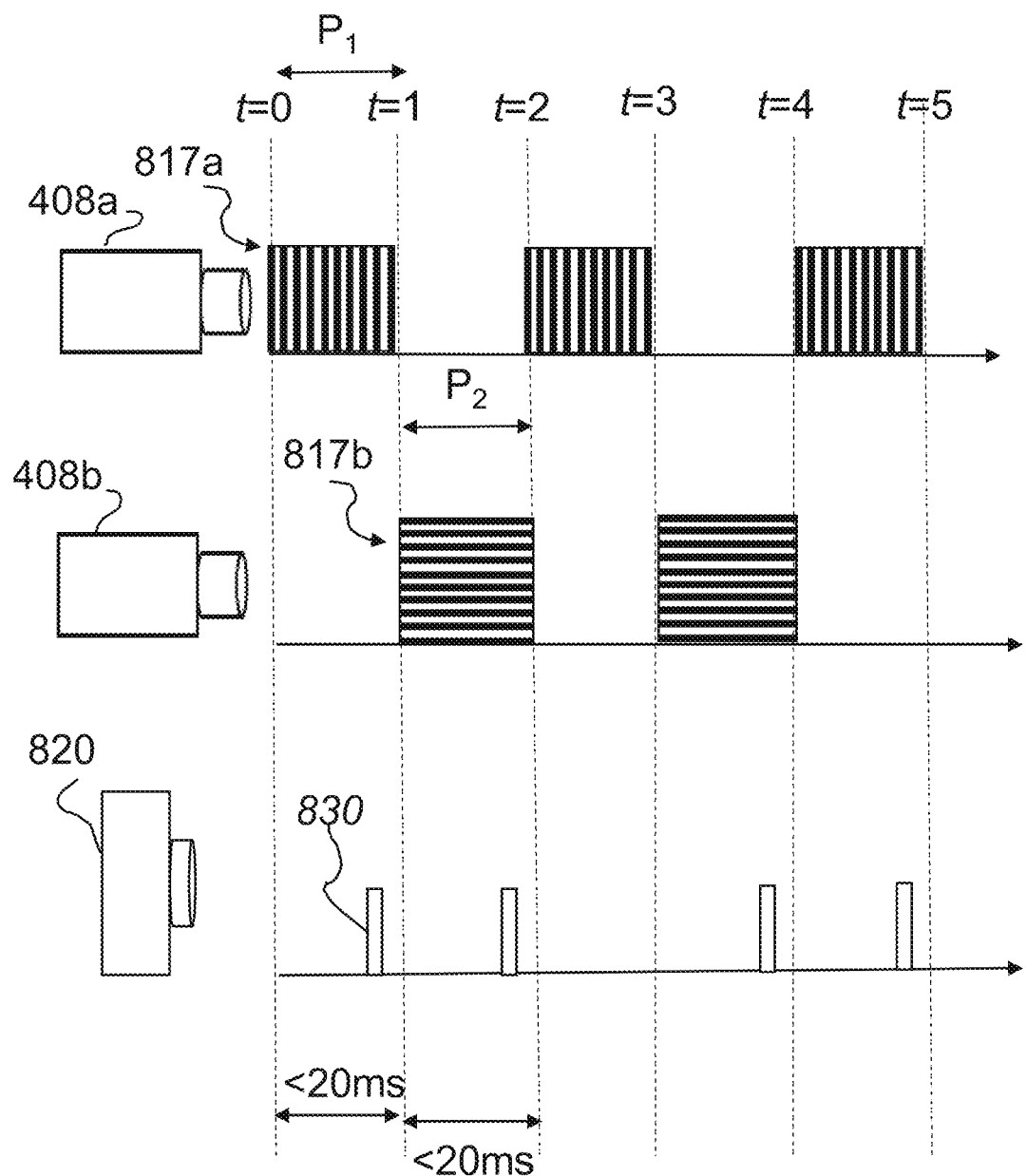
FIG. 6 is a timing diagram according to an example embodiment described herein.

FIG. 6 is a timing diagram illustrating an example implementation of a multi-shot method described above and illustrated in the flowchart of FIG. 5. As shown in FIG. 6, headlights 408a and 408b may, in effect, take turns projecting their corresponding respective patterned light 817a, 817b. As a result, projected patterned light 817a, 817b may be switched from one to the other at a rate defined by time intervals P1 and P2. In the example embodiment, the first and the second time intervals P1 and P2 may be set so that the projected patterned light may switch from one to the other at a switching rate greater than approximately 50 switches per second. In that case, synch timer 920 may set time interval $P_1$ for no longer than about 20 ms, and likewise set time interval $P_2$ for no longer than about 20 ms.

As shown in FIG. 6, patterned light 817a may be formed by light engine 807a and projected by headlight 408a between t=0 and t=1, which may correspond to P1. At the end of P1, patterned light 817a may be deactivated at t=1 (if not already deactivated), and patterned light 817b may be formed by light engine 807b and projected by headlight 408a between t=1 and t=2 corresponding to P2. At t=2, which may be the time of expiration of P2, patterned light 817b may be deactivated (if not already deactivated), and patterned light 817a may again be formed by light engine 807a and projected by headlight 408a between t=2 and t=3 corresponding to P1, and so forth.

At some time within each P1 interval, the controller may send at least one first capture signal 830 to camera 820. In response, light sensing and measuring surface 824 of camera 820 may sense light reflected from the surfaces of objects (e.g., surface 801 of object 802) in scene 803, and camera 820 may capture the sensed light as an image in which projected light pattern 817a appears in the captured image of object 802. Likewise, at some time within each P2 interval, the controller may send at least one second capture signal 830 to camera 820. In response, light sensing and measuring surface 824 of camera 820 may sense light reflected from the surfaces of objects (e.g., surface 801 of object 802) in scene 803, and camera 820 may capture the sensed light as an image in which projected light pattern 817b appears in the captured image of object 802. The surface geometry of object 802 can be reconstructed based on patterned light 817a, 817b as they appear in the first and second captured images.

Intervals P1 and P2 may be chosen to be less than about 20 ms based on characteristics of normal human vision. The human eye may require longer than about 20 ms to form a complete image in response to sensed light, although this time can vary depending on factors like the intensity of the light. At switching rates below about 50 switches per second (e.g., each patterned light projected for longer than about 20 ms), the human eye will typically be able to perceive as flicker changes from the projection of patterned light 817a to the projection of patterned light 817b and vice versa. This may be particularly likely in cases in which patterned light 817a and 817b are selected to have high contrast with respect to each other. The flickering light could be distracting to humans driving vehicles in the vicinity of vehicle 400.

To avoid the flicker effect, the controller may cause patterned light 817a and 817b to be projected for no longer than 20 ms each to maintain the switching rate above about 50 switches per second. In some embodiments, the switching rate may be selected based on a rate at which the human eye in a test case will blend the projected patterned light so as to avoid the flicker effect.

On the other hand, in many practical applications, it may be desirable to have patterned light 817a and 817b with high contrast so as to be clearly distinguishable from one another in captured images of object 802. To achieve that goal without decreasing the switching rate below a rate at which flicker will be perceived, camera 820 may include a light sensing and measuring surface 824 (illustrated in FIG. 1), which can form a complete image of a projected patterned light in significantly less exposure time than 20 ms. Thus, even though the patterned light may be switching at rates faster than about 50 Hz, camera 820 can still capture first and second images of objects in which patterned light 817a is reflected in the first image and patterned light 817b is reflected in the second image.

In some embodiments, the controller may send control signals so that patterned light 817a and 817b may be flashed ON and OFF one or more times during their respective projection time intervals P1 and P2, respectively, instead of being projected continuously throughout P1 and P2, respectively (e.g., in order to achieve higher resolution in the captured images or to accommodate environmental conditions or other factors). For the same reasons, in some embodiments, the controller may send more than one capture signal during intervals P1 and P2.

In the example embodiment of FIG. 6, patterned light 817a projected by headlight 408a may define a vertical stripe pattern that is opposite the horizontal stripe pattern of patterned light 817b projected from headlight 408b. This pattern difference can increase contrast and can make reflections of patterned light 817a and 817b more readily distinguishable from each other in images of object 802 captured by camera 820.

Examples of the patterned lights 817a and 817b are illustrated in the drawing figures herein and are simplified for purposes of explanation. In practice, patterned light 817a and 817b can define a wide variety of other patterns or shapes. As mentioned above, additional examples of suitable patterns for patterned light 817a and 817b are depicted in FIG. 3A.

In reconstructing the surface geometry of a surface 801 of object 802 in scene 803 (shown in FIG. 1), scene 803 (or surface 801) can be considered as a function that may map light emitting elements of arrays 102a, 102b (projector pixels) comprising headlight 408a, 408b onto light sensing elements (imager pixels) (not shown) of light sensing and measuring surface 824 of camera 820. Light sensing elements comprising surface 824 may be in turn mapped by imager electronics 823 to picture elements (pixels) whose variations in brightness value from pixel to pixel define a shape for each corresponding reflected patterned light in images of object 802 captured by camera 820. A 3D image of surface 801 of object 802 may be reconstructed by analyzing the patterned light shapes in the captured images. Knowledge of an object's surface geometry may facilitate computer recognition and identification of the object. In an autonomous vehicle, rapid and accurate identification of objects in the travel path of the vehicle may be highly desirable, for example, to allow the vehicle to quickly determine and initiate evasive maneuvers if necessary.

Figure 7:
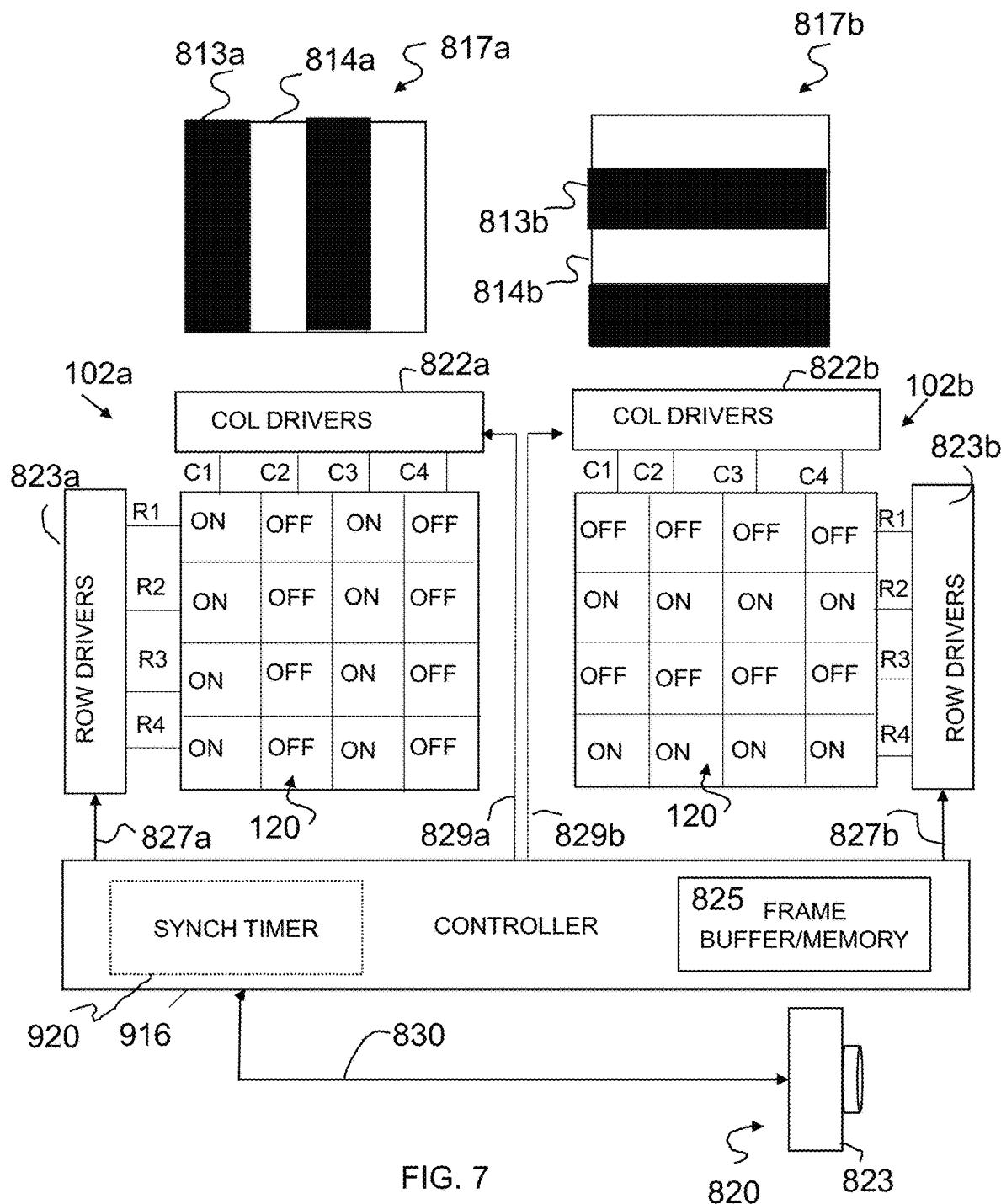
FIG. 7 is a simplified block diagram of a system according to embodiments described herein.

FIG. 7 is a simplified block diagram of vision system 800 configured to implement the multi-shot method described above with respect to the flowchart of FIG. 5A and according to the time sequence depicted in FIG. 6.

Components and their arrangement, as shown in the example of FIG. 7, are but one possible implementation. A wide range of equivalent components and arrangements would be appreciated by persons of ordinary skill. For example, instead of row and column drivers to select LEDs to have an ON state, some implementations can have individually addressable light elements 120 that are coupled to a bus to which the controller may be coupled. The controller could provide signals that select individual LEDs of array 102a, 102b, or groups of LEDs, including columns and rows of LEDs by applying an address unique to that LED or group of LEDs to the bus. Individual LEDs can include decoders that decode addresses. Those LEDs with an address matching the decoded address can respond to drive signals accordingly. The controller itself can comprise more than one controller component and can be implemented in various combinations of hardware and software, firmware or middleware components.

Turning now to FIG. 7, at time t=0, controller 916 (or any other controller as described above) may provide the first control signals including control signal 827a to row driver 823a to select rows R1-R4, and control signal 829a to column driver 822a to select columns C1 and C3. Accordingly, at time t=0, the row and column drivers may drive emitters R1C1, R2C1, R3C1 and R4C1 and emitters R1C3, R2C3, R3C3 and R4C13 to be in an ON state because these emitters have their corresponding rows and columns both selected. In that manner, the controller 916 may control the array 102a to project patterned light 817a from time t=0 to time t=1.

And at time t=0, emitters R1C2, R2C2, R3C2 and R4C2, as well as emitters R1C4, R2C4, R3C4 and R4C4 of array 102b, may be deactivated (e.g., in an OFF or non-emitting state). Accordingly, at time t=0 (or immediately thereafter), controller 916 may control array 102a to project patterned light 817a. In this example, patterned light 817a may be defined by two vertically extending light stripes 813a comprising LEDs in an emitting state (ON), alternating with two vertically extending light stripes 814a comprising LEDs in a non-emitting state (OFF). Each stripe 813a, 814a may correspond to a respective column of illuminated and non-illuminated emitters of array 102a. During time t=0 to t=1, controller 916 can control all emitters of array 102b to remain in an OFF state.

At time t=1, controller 916 may provide control signals 827a and 829a so that corresponding row driver 823a does not select any row and column driver 822a does not select any column of array 102a. For example, controller 916 can stop generating drive signals 827a and 829a or can generate drive signals 827a and 829a in some other manner that ensures row driver 823a and column driver 822a select none of rows R1-R4 and none of columns C1-C4 after time t=1. Controller 916 can control array 102a to effectively cease projecting patterned light 817a (or any light at all) from time t=1 to time t=2 or for any portion of that time.

At time t=1, controller 916 may also provide second drive signals including drive signal 827b to row driver 823b to select rows R1-R4 of array 102b and drive signal 829b to column driver 822b to select columns C1 and C3 of array 102b. Accordingly, at time t=1, the second drive signals may drive emitters R2C1, R2C2, R2C3 and R2C4 and emitters R4C1, R4C2, R4C3 and R4C4 to be in an ON state because these emitters have their corresponding rows and columns both selected. And at time t=1, emitters R1C1, R1C2, R1C3 and R1C4 and emitters R3C1, R3C2, R3C3 and R3C4 may be deactivated (e.g., in an OFF or non-emitting state). Accordingly, at time t=1 (or immediately thereafter), controller 916 may control array 102b to project patterned light 817b. In this example, patterned light 817b may be defined by two vertically extending light stripes 813b, each stripe 813b corresponding to a row of illuminated emitters of array 102b. Controller 916 can control array 102b to project patterned light 817b from time t=1 to time t=2 or for any portion of that time.

At time t=2, controller 916 may generate control signals 827b and 829b so that corresponding row driver 823b does not select any row and column driver 822b does not select any column of array 102b so that no LEDs in array 102b are ON. In other words, between time t=2 and t=3, headlight 408b shown in FIG. 1 may not be projecting light into travel path 20.

Also, at time t=2, controller 916 may once again provide the first control signals including control signal 827a to row driver 823a to select rows R1-R4 and control signal 829a to column driver 822a to select columns C1 and C3 of array 102a. Accordingly, at time t=2, the row and column drivers may drive emitters R1C1, R2C1, R3C1, and R4C1 and emitters R1C3, R2C3, R3C3, and R4C13 to be in an ON state because these emitters have their corresponding rows and columns both selected. And at time t=2, emitters R1C2, R2C2, R3C2, and R4C2, as well as emitters R1C4, R2C4, R3C4, and R4C4 may again be deactivated (e.g., in an OFF or non-emitting state). Accordingly, at time t=2 (or immediately thereafter), controller 916 may control array 102a to emit patterned light so that headlight 408a projects patterned light 817a. Controller 916 can control array 102a to project patterned light 817a from time t=2 to time t=3.

At time t=3, controller 916 may once again generate control signals 827a and 829a so that corresponding row driver 823a does not select any row, and column driver 822a does not select any column of array 102a. In other words, controller 916 may control array 102a so that no light is projected by headlight 408a from time t=3 to time t=4.

At time t=3, controller 916 may again provide second control signals including control signal 827b to row driver 823b to select rows R1-R4 of array 102b and drive signal 829b to column driver 822b to select columns C1 and C3 of array 102b. Accordingly, at time t=3, the column and row drivers may drive emitters R2C1, R2C2, R2C3 and R2C4 and emitters R4C1, R4C2, R4C3 and R4C4 to be in an ON state because these emitters have their corresponding rows and columns both selected. And at time t=3, emitters R1C1, R1C2, R1C3 and R1C4 and emitters R3C1, R3C2, R3C3 and R3C4 may be deactivated (e.g., in an OFF or non-emitting state). Accordingly, at time t=3 (or immediately thereafter), controller 916 may once again control array 102b to project patterned light 817b. Controller 916 can control array 102b to project patterned light 817b from time t=3 to time t=4.

At time t=4, controller 916 may once again send first and second control signals to row and column drivers of arrays 102a and 102b as described above with respect to time t=0 and t=2 so that array 102a may emit light for projection as patterned light 817a from time t=4 to time t=5 and array 102b may not emit light between time t=4 and t=5. The algorithm described above may repeat for any number of iterations until an interrupt signal terminates the procedure. For example, an interrupt can be triggered by the occurrence of a predefined event, such as in the event headlights 408a and 408b are manually deactivated by driver action or in the event a predefined time period expires or when some other predefined event occurs.

As shown in FIG. 7, controller 916 may also provide a capture signal 830 to camera 820 so that electronics 823 of camera 820 may read light measurements from light sensing and measuring surface 822 at predetermined times. According to the protocol of FIG. 4, controller 916 may synchronize capture signal 830 with the first and second drive signals so that camera 820 may capture an image of scene 803 in the travel path 20 of the vehicle 400 (as illustrated in FIG. 1A) at least once during time interval t=0 to t=1, at least once again at during time interval t=1 to t=2, etc. In that manner, patterned light 817a but not 817b may appear in any image of object 802 captured during t=0 to t=1 at which time patterned light 817a but not 817b may appear in captured images of object 802. Likewise, images captured during t=1 to t=2 may reflect patterned light 817b but not patterned light 817a. An image reconstruction processor can reconstruct the surface geometry of object 802 by comparing the images reflecting patterned light 102a with images reflecting patterned light.

In other embodiments, the capture signal 830 may be received by the controller 916 from the camera 820 or other systems within the vehicle 400. The receipt of the capture signal 830 may cause the controller 916 to synchronize the first and second drive signals with the capture signal 830 so that camera 820 may capture an image of scene 803 in travel path 20 of vehicle 400 (as illustrated in FIG. 1A)

Figure 8:
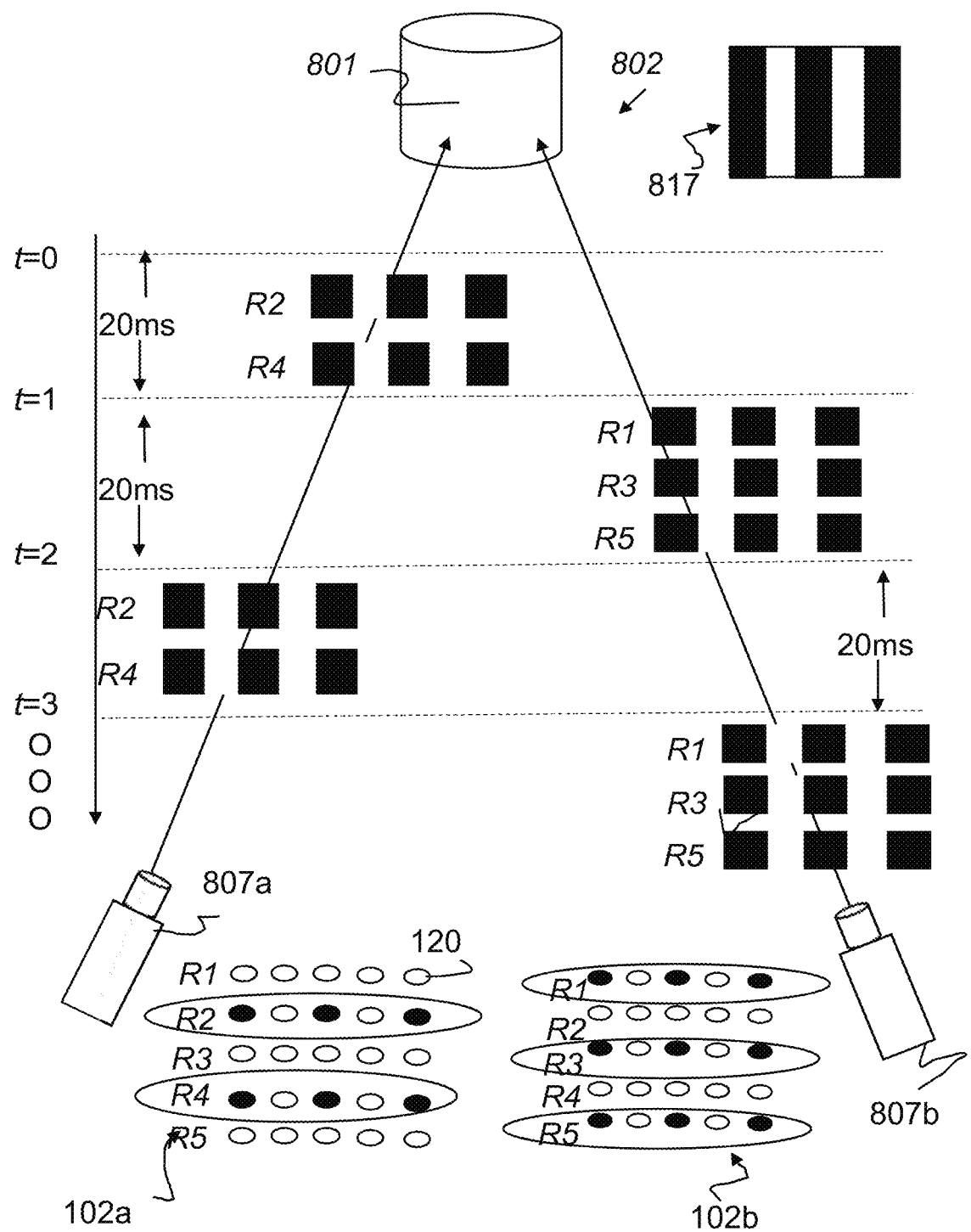
FIG. 8 is a pictorial diagram illustrating an example embodiment.

FIG. 8 is a pictorial illustration of an embodiment of system 800 in which headlights 408a, 408b alternately project first and second patterned light in the manner described above. However, in the system shown in FIG. 8, controller 916 may control LEDs comprising every other row of array 102a to emit light in accordance with an ON/OFF pattern corresponding to pattern 817 while controlling all LEDs in the other rows of array 102 to be driven OFF. Controller 916 may control rows of array 102b corresponding to the remaining rows of array 102a (rows switched OFF between t=0 and t=1) to emit light in accordance with an ON/OFF pattern corresponding to portions of pattern 817 not represented in array 102a. The combination of the light emitting rows of array 102a and the light emitting rows of array 102b may be blended as the projections are switched, thereby forming a combined projected patterned light corresponding to patterned light 817.

For example, at time t=1, emitters comprising rows R2 and R4 in column 1 of array 102a may be switched ON. Emitters comprising rows R2 and R4 in column 2 of array 102a may be switched OFF, emitters comprising rows R2 and R4 in column 3 of array 102a may be switched ON and emitters comprising rows R2 and R4 in column 4 of array 102a may be switched ON. Thus, rows R2 and R4 may each reflect a portion of the stripe pattern defined by corresponding portions of light pattern 817. The remaining rows comprising array 102a may have all emitters switched OFF.

At time t=1, all emitters of array 102a may be switched OFF and emitters comprising R1, R3 and R5 of array 102b may be switched to have relative ON and OFF emission states corresponding to portions of light patterns 817 for which emitters in corresponding rows R1, R3 and R5 of array 102a were OFF during projection of array 102a between t=0 and t=1. Light engine 807b may project a portion of pattern 817a corresponding to rows R1, R3 and R5 between t=1 and t=2. At time t=2, all emitters of array 102b may be switched OFF and the emitters in rows R2 and R4 of array 102a may again be switched ON between t=2 and t=3, and so forth.

Thus, between time t=0 and t=1, light engine 807a of first headlight 408a may project a light contrast pattern defined by every other row of first array 102a. Between time t=1 and t=2, light engine 807b of second headlight 408b may project a light contrast pattern corresponding to light pattern 817 in rows R1, R3 and R5 of array 102a. The projections may be switched at a rate greater than about 50 switches per second so to avoid a perception of flicker.

At some time between t=0 and t=1, controller 916 may send a capture signal to camera 820 so that camera 820 can capture the first projected patterned light comprising R1 and R2 of array 102a reflected from a surface 801 of an object 802 in travel path 20. At some time between t=1 and t=2, controller 916 may send a capture signal to camera 820 so that camera 820 can capture the second projected patterned light comprising R1, R3 and R5 of array 102b reflected from a surface 801 of object 802. Camera 820 may provide the first and second images to an image processor (not shown) that may reconstruct the surface geometry of surface 802 based on the reflections of the first and patterned light in the captured images.

Figure 9:
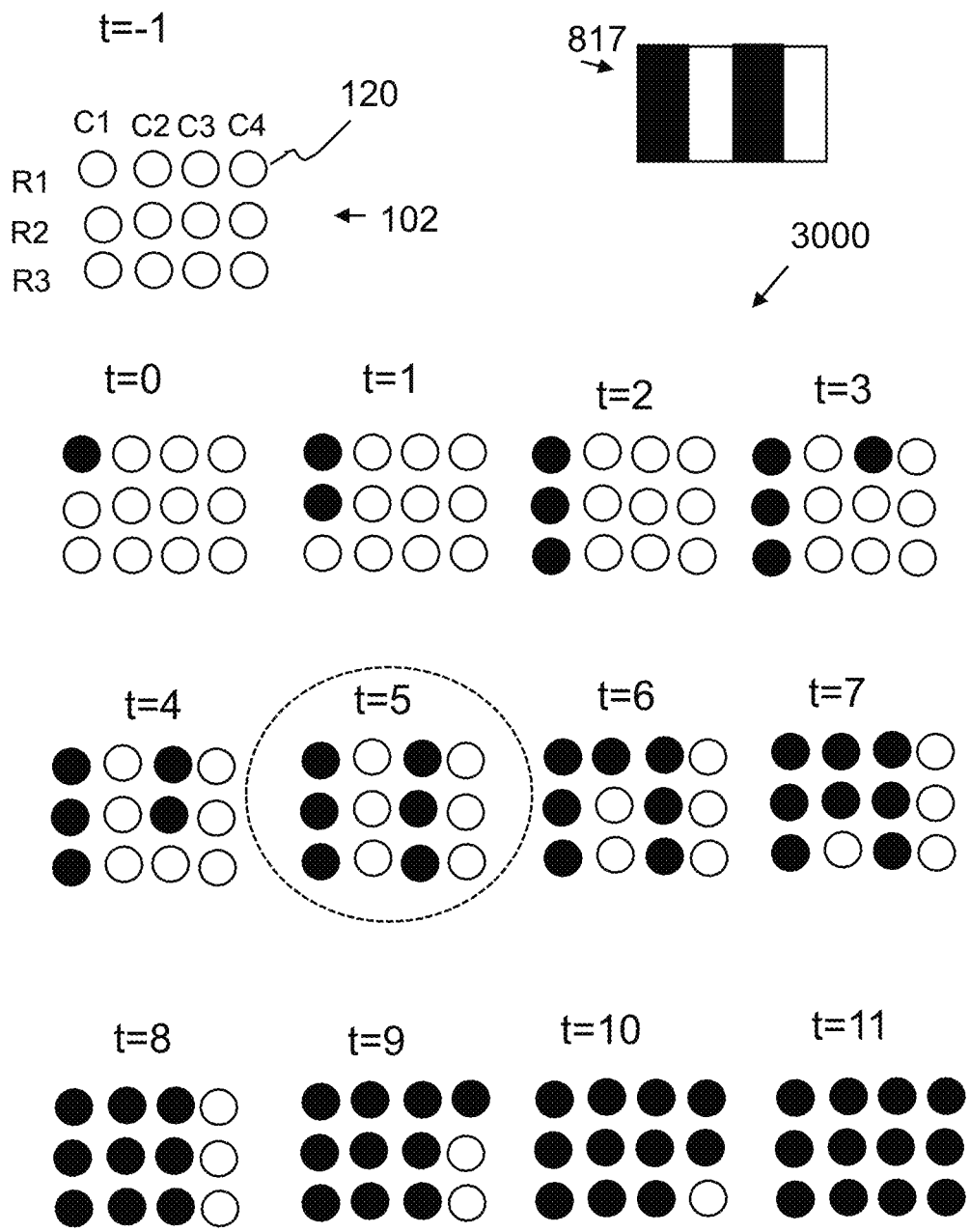
FIG. 9 is a pictorial illustration of a sequence of array states according to an embodiment described herein.

FIG. 9 is a pictorial diagram depicting an example illumination sequence 3000 for emitters 120 corresponding to array 102 of system 800 as shown in FIGS. 1 and 2. As described above with respect to FIG. 4, array 102 can comprise thousands, tens of thousands or even more emitters which can be arranged to define arrays and matrices of any dimension. For ease of illustration and description, a simplified representative array 102 is depicted in FIG. 9. Simplified representative array 102 comprises 12 emitters arranged to define three rows (R1 to R3) and four columns (C1 to C4).

Illumination sequence 3000 is depicted as a series of snapshots or states of array 120 in which each snapshot or state is defined by a particular arrangement of ON and OFF emitters. In some embodiments, an ON emitter is an emitter driven to emit light at a full brightness (full intensity) level and an OFF emitter is an emitter that either does not emit light, for example by virtue of a switch in its current path that operates to interrupt current flow through the LED for some period of time. In other embodiments, an OFF emitter may be any emitter that is driven to emit light at some brightness or intensity level less than full brightness or intensity. In some embodiments, the intensity level corresponding to OFF is defined by a threshold intensity level value that defines a transition from OFF to ON and vice versa.

For ease of description, an example embodiment is described in which an OFF emitter does not emit light, for example by action of a switch in its current path (e.g., switch 751a shown in FIG. 13). The emitter may switch from OFF to ON in accordance with a position of the switch (open or closed). While system 800 is described herein in terms of a switch in series with an LED (see, e.g., FIG. 13), persons of ordinary skill will appreciate a variety of equivalent switch configurations including switches disposed in parallel with LEDs are possible. In a parallel switching arrangement, an LED may be in an OFF (non-emitting) state when the switch is closed to shunt current around the LED. The LED may be ON (emitting) when the switch is opened so the shunt path is not available and the current flows through the LED.

Returning now to FIG. 9, sequence 3000 may be defined by a series of snapshots taken at successive, respective times (clock ticks) that occur at pre-defined intervals starting with the first tick at time t=0 and ending with the last tick at time t=11. At time t=−1, immediately preceding time t=0, all emitters 120 of array 102 may be OFF. Between time t=0 and t=11, emitters 120 may be switched ON according to sequence 3000 so that all emitters are ON at the end of sequence, e.g., at time t=11.

Sequence 300 may be characterized in a first aspect in that switching an array from OFF (all emitters 120 of array 102 are OFF) to ON (all emitters 120 of array 102 are ON) may not result in every emitter 120 of array 102 switching from OFF to ON at the same time. If that were the case, switching the array from OFF to ON would cause the array to present a large and sudden increase in load to the vehicle power supply. This could produce spikes in voltage and/or current that could damage the emitters, the power supply or other components in power path.

Sequence 3000 may be further characterized in a second aspect in that, at some time to that coincides with a tick that occurs between t=0 at which time all emitters 120 are OFF, and the tick at t=11 at which time all emitters are ON, a pattern of ON emitters and OFF emitters may define a stripe pattern 817 emitted from array 102. Stripe pattern 817 may correspond to a patterned light that will have highest structural contrast between time $t_C$ and the text occurring tick. At the next occurring tick, an emitter in a dark portion of the pattern will be switched ON.

In the simplified illumination sequence 3000, the fully defined stripe pattern 817 may first be presented at t=5. In that pattern, to coincides with tick at t=5 and persists until tick at t=6. In that case, array 102 may emit stripe pattern 817 with highest contrast between times t=5 and t=6. At t=6, an emitter in the dark portion of pattern 817 may be switched ON, thereby reducing contrast within the pattern. Although a particular stripe pattern 817 occurs at t=5 in the simplified example, those of ordinary skill reading the description herein may easily be able to extend the simplified example to a wide variety of practical implementations with larger arrays, e.g., the array described above with respect to FIG. 4A, and stripe (or other shape) patterns, e.g., patterns such as those illustrated in FIG. 2A. As will be appreciated by those of ordinary skill based on the simplified example described herein, the number of snapshots or states of array 102 between start time and end time may vary with dimensions of array 102 and choice of light pattern 817 in any particular practical implementation. Likewise, the time between snapshots, or tics, may vary with array size, light pattern, clock speed and other variables and constraints in particular practical implementations.

For purposes of explanation, all emitters 120 may be OFF at a time t=1 immediately before sequence 3000 is initiated. Sequence 3000 can be initiated manually, for example by a human operator switching on headlights 408a, 408b of vehicle 400 as depicted in FIGS. 1 and 2. Sequence 3000 can also be initiated automatically, such as by controller 916 illustrated in FIG. 2 sending a 'START sequence' signal to array 102, or by another controller or processor either in the vehicle or external to the vehicle sending a signal to initiate sequence 3000. Once initiated, sequence 3000 can repeat until interrupted, such as by a human manually operating a headlight ON/OFF switch, by controller 916 programmed in accordance with events corresponding to interrupts, or by detection of a predefined event by any other device or system communicating with controller 916 to send an interrupt corresponding to detection of such an event.

In response to receiving a START signal, array 102 may change from its state at t=−1 (no emitters ON) to its state at time t=0, at which time controller 916 may provide a signal that may cause the emitter 120 in the row 1, column 1 position (R1C1) to switch from OFF to ON, after which emitter R1C1 may remain ON at least until t=11. At the next clock tick (t=1), emitter R2C1 may likewise be switched from OFF to ON and likewise may remain ON until t=11. At t=2, emitter R3C1 may be switched ON and remain ON. At t=2, emitters of array 102 may define a first stripe comprising patterned light 817. At t=3, emitter R1C3 may be switched ON. At time t=4, emitter R2C3 may be switched ON. At time t=5, emitter R3C3 may be switched ON. At t=5, a second stripe corresponding to patterned light 817 may be defined. Sequence 3000 may continue switching emitters ON one after another at each tick until all emitters are ON at t=11. At t=11, sequence 3000 may either repeat or terminate. In embodiments in which sequence 3000 repeats, all emitters can be switched OFF at, or after, the tick at t=11 so that all emitters are once again OFF at the start of sequence 3000.

Figure 10:
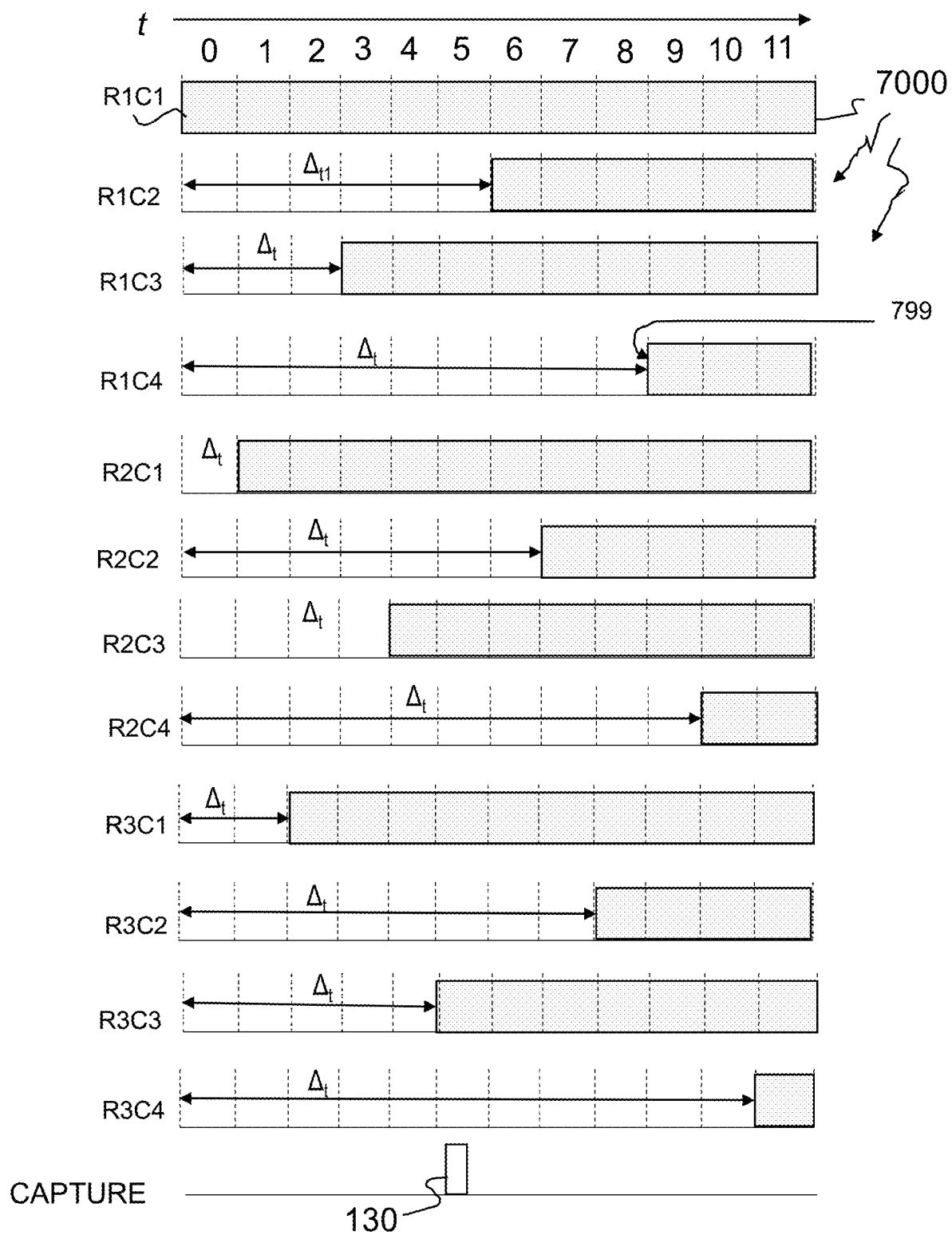
FIG. 10 is a timing diagram illustrating delay times for switching emitters of an array according to an embodiment described herein.

FIG. 10 is a timing diagram for configuring controller 916 of system 800 (shown in FIGS. 1 and 2) to drive emitters 120 of the simplified example array 102 shown in FIG. 9 to switch from OFF to ON in accordance with sequence 3000 to generate the example light pattern 817 shown in FIG. 9. Array 102 can represent one or both arrays 102a and 102b in FIGS. 1, 2, 11 and 12. Both arrays 102a, 102b can emit the same light pattern 817. However, higher contrast between the first patterned light and the second patterned light may be achieved in embodiments in which array 102a is configured as described herein so that headlight 408a projects a first light pattern (e.g., pattern 817a shown in FIG. 2), and array 102b is configured as described herein so that headlight 408b projects a second light pattern that is opposite, or at least different than the first light pattern (e.g., light pattern 817b shown in FIG. 2).

In the timing diagram of FIG. 10, each time line 7000 may correspond to a respective drive signal provided to a corresponding respective emitter. Each drive signal may be labeled by an emitter identifier that indicates the corresponding emitter by its column and row position in array 120. The drive signals shown individually in FIG. 10 may be indicated collectively in FIGS. 1, 2, 11 and 12 as corresponding to control signals 840a and/or 840b. Ticks in FIG. 10 may correspond to ticks in FIG. 9. As shown in FIG. 10, controller 916 may provide signals that may cause each respective drive signal to transition from low to high at a different time relative to a time of the first tick that may occur at t=0. Accordingly, a delay time for switching any given emitter from OFF to ON may be defined as a difference between a time at which the first tick occurs at t=0 and a subsequent time at which a low to high transition occurs in a drive signal to that given emitter, thereby switching the given emitter from OFF to ON. In this context, a delay may be defined with respect to time t=0.

As described above with respect to FIG. 9, no two emitters 120 in array 102 may have the same time delay. Accordingly, only one emitter at a time may switch from OFF to ON in sequence 3000. As seen in FIG. 10, the delay time for each emitter may change from one emitter to the next in accordance with a pattern. In other words, the delay time between successive emitters in the array may be alternating between a short delay for one emitter relative to longer delay time for a neighboring emitter, to relatively short delay time relative to the next neighboring emitter and so forth. For example, the delay time for emitter R1C12 may be long relative to the delay time for emitter R1C3, which short relative to the delay time for R1C4 and so on.

Table 1 may correspond to an example data structure of system 800 configured to contain delay values for switching ON each of the emitters 120 comprising array 102 in accordance with sequence 3000. The delay values may be expressed in terms of relative time units. As those of ordinary skill will appreciate, actual time values in terms of, for example, seconds corresponding to the relative units in Table 1, may depend on particular implementation parameters and constraints.

TABLE 1

|    | Col 1 | Col 2 | Col3 | Col 4 |
|----|-------|-------|------|-------|
| R1 | 0     | 6     | 3    | 9     |
| R2 | 1     | 7     | 4    | 10    |
| R3 | 2     | 8     | 5    | 11    |

In one example, the system 800 in which headlights are switched in accordance with the timing diagram in FIG. 6 so that the projected patterned light are indistinguishable by normal human vision, the longest total period of time that array 102a of headlight 408a will remain ON can be about 20 ms, after which the first projected patterned light 817a projected by headlight 408a deactivates (all emitters OFF) and headlight 408b then projects second patterned light 817b for no longer than about 20 ms. To implement the example of FIG. 6 in the simple example shown in FIG. 9, in one embodiment, the time from t=5 to t=6 may be less than about 20 ms. In other embodiments, the time from t=0 to t=12 may be less than about 20 ms. Each snapshot or state of array 102a in sequence 3000 may represent a time period within those constraints. For example, in the latter embodiment, each snapshot may persist for no longer than 20/12 ms. In that case, the R1C2 emitter may have a delay with respect to time t=0 of 6×20/12 ms. The R1C3 emitter may have a delay of 3×29/12 ms, and so forth.

FIG. 10 also shows the timing of capture signal 130 with respect to the timing of drive signals for each emitter 120. FIG. 10 shows capture signal 130 occurs between t=5 and t=6, which may correspond to the snapshot or state at which emitters 120 define stripe pattern 817. At that time, camera 820 can capture an image of an object and the patterned light projected at that time will be reflected in the captured image.

Figure 11:
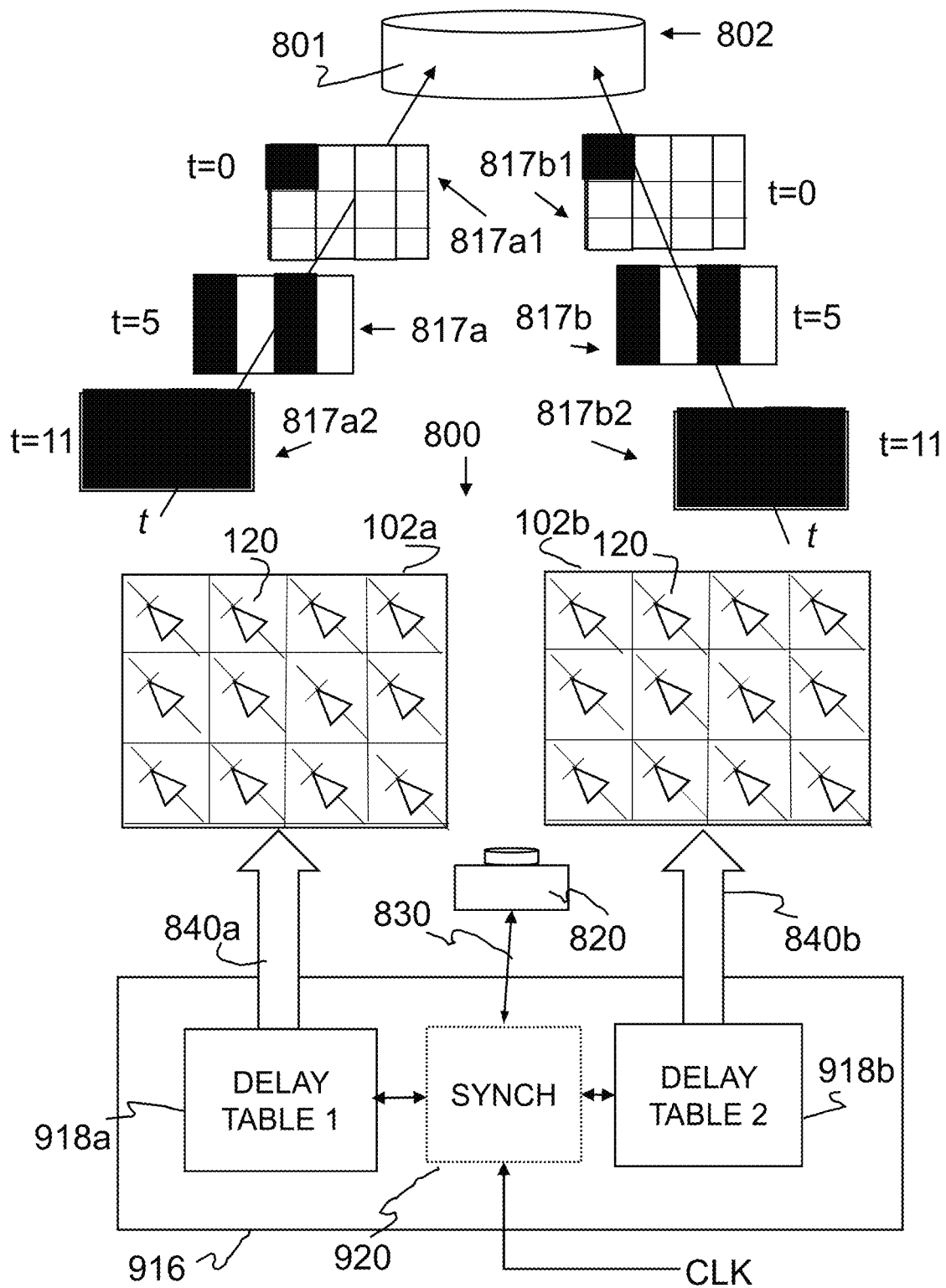
FIG. 11 is a high-level block diagram of a system according to an embodiment described herein.

FIG. 11 is a simplified block diagram showing system 800 configured in accordance with FIGS. 9 and 10 as described above in one example embodiment of system 800. As shown in FIG. 11, controller 916 (examples illustrated in FIG. 2, 7, 10) may include first and second data structures 918a, 918b (corresponding to two instances of Table 1 above) each of which contains relative delay time values for each emitter comprising corresponding arrays 102a, 102b. Table 1 can be implemented in a memory of controller 916 (or an external memory), for example as a table comprising a database that structures such a memory.

As noted above, the relative delay values in Table 1 are only a simplified example of one possible embodiment. A person of ordinary skill upon reading the description of the simplified example herein with reference to FIGS. 9 and 10 will be able to extend the simplified example to select appropriate relative delay values to implement delay tables for a wide range of array dimensions and headlight configurations, including very large arrays such as the array described herein with reference to FIG. 4A.

Controller 916 may include a synch timer 920, which can be a clock structure configured, for example, to divide a system clock into the particular ticks that define the snapshots or states of array emitters in sequence 3000 as described above with respect to FIGS. 9 and 10 and programmed to identify a time T, corresponding, for example, to tick t=5 in the example of FIG. 9. Controller 916 may provide control signals corresponding to drive signals 840a, 840b in accordance with the ticks such that transitions in the drive signals to drive emitters to the ON state may be delayed according to delay values provided in delay tables 918a, 918b respectively. FIG. 11 shows representative snapshots or states of each array 102a 102 b at t=0, t=5 and t=11 to illustrate a characteristic of sequence 3000.

Persons of ordinary skill will appreciate equivalent embodiments in which only controller 916 comprises only one delay table structure that provides delay values for both arrays 102a and 102b. Likewise, controller 918a can be implemented as one integrated circuit (IC) structure configured to perform all of the functions described herein, or alternatively, the functions of controller 918 can be distributed among a plurality of IC structures, such that controller 918 comprises the plurality of IC structures configured to perform those functions. For example, these structures and functions may be distributed among the circuit board 1306 and customer board 1308.

Synchronization timer 920 may be configured to count clock ticks and to track corresponding times and time delays that determine at what points in real world time each array 102a, 102b respectively advances from one snapshot or state to the next in accordance with sequence 3000. Synchronization timer 920 may also be programmed to determine particular relative delay times at which emitters of array 102a and 102b may define respective corresponding light patterns 817a and 817b in their highest contrast snapshot. As described above, at times corresponding to those particular relative delay times, controller 916 may send a capture signal to camera 830 (examples illustrated in FIG. 2, 7, 10). In some instances, the Synch Timer 920 is located in the controller 916. In other instances, the synch timer is part of the camera 820. In further instances, the Synch Timer is part of the car systems 212.

For example, in the simplified embodiment of FIGS. 9 and 10, controller 916 may send capture signal 130 at some point in time immediately after a time corresponding to t=5 (relative time the ON and OFF emitters define stripe pattern 817) and before a time corresponding to delay time t=6. At t=6, controller 916 may send a control signal that drives an additional emitter to switch from OFF to ON. When an additional emitter is ON after delay t=6, the light from that emitter may decrease contrast in the stripe pattern generated immediately after delay t=5. In that manner, controller 916 may be configured to synchronize control signals 840a, 840b to arrays 102a, 102b such that camera 820 captures images of an object, for example object 803 shown in FIG. 2, at a time at which at least one of headlights 408a, 408b is projecting a patterned light defined by stripe pattern 817a or 817b respectively. The surface geometry of a surface 801 of object 803 may be reconstructed based on reflections of the projected patterned light in the captured images of object 803. In that manner, vision system 800 'sees' object 803 with 3D vision.

FIG. 12 is a block diagram of an example of system 800 illustrated in FIG. 11 implemented in the context of a pulse width modulation (PWM) dimming configuration of headlights 408a, 408b. As shown in FIG. 12, system 800 may include controller 916, camera 820 and emitter arrays 102a, 102b comprising first and second headlights 408a, 408b respectively. In the example embodiment of FIG. 12, each emitter 120 may be referred to herein as an LED unit 120. Each LED unit 120 comprises a light emitting diode 751a and a switch 752a.

It will be understood that FIG. 12 is a simplified representation that shows only one representative LED unit 120 in each of the arrays 102a, 102b. However, as described above with respect to array 102 shown in FIG. 4A, each array 102a and 102b can comprise thousands, tens of thousands, or more LED units 120. A person of ordinary skill reading the description of the simplified example of FIG. 11 would understand how to extend the simplified example to implement arrays of any dimension, including the large arrays described with respect to FIG. 4A.

In one common PWM dimming arrangement, switches 752a, 752b may be arranged in series with LEDs 751a, 751b respectively. Switches 752a, 752b may be driven by corresponding PWM controllers 700a, 700b to periodically interrupt current through the LEDs in accordance with pulse width modulation (PWM) signals 702a, 702b. PWM signals 702a, 702b may comprise pulses that repeat at a pulse repetition rate (PRR) and whose pulse widths in any given one or more repetitions are adjustable. The average pulse widths over a time period may define an average current through the corresponding LED during the time period, and thus may define an average intensity of light emitted by the corresponding LED over the time period. As explained above with respect to the switching rate of projected patterned light, the PRR may be sufficiently high that the periodic interruptions in light emission are not detectible by normal human vision.

The embodiment of FIG. 12 implements the time delays described above with respect to FIGS. 9 and 10 by delaying the time at which each PWM signal is provided to each respective corresponding LED unit. For example, when arrays 102a, 102b comprising headlights 408a, 408b are initially switched to their ON state, for example by manual action of a human driver operating a headlight ON/OFF switch, or by some other form of START signal, PWM controllers 700a, 700b may commence providing PWM signals 702a, 702b to switches 752a, 752b respectively of every LED unit comprising arrays 120a and 120b. The PWM signals may be configured to modulate current flowing through the corresponding LEDs 751a, 751b respectively in accordance with a pulse width and PRR that corresponds to the respective target brightness levels of LEDs 751a, 751b.

To transition arrays 102a, 102b from their initial state in which all LEDs are OFF to their final state at which all LEDs are OFF and ON at levels determined by their PWM signals, controller 916 may rely on the delay values in delay tables 918a, 918b to operate switches 764a, 754b to turn ON in a sequence 3000 (as per FIGS. 9 and 10) defined by the delays table entries. Accordingly, delayed PWM signals 704a, 704b may be provided to arrays 102a, 102b respectively. Example delay table entries may be described in Table 1 above and are further described with respect to FIGS. 9 and 10.

As described above with respect to FIGS. 9 and 10, synch timer 920 of controller 916 may provide at least one first capture signal 830 to camera 820 at some time period during which array 102a is projecting a first patterned light 817a as determined by delayed PWM signals 704a so that camera 820 can capture an image of first patterned light 817a reflected from a surface 801 of an object 802. Likewise, controller 916 may provide at least one second capture signal 830 to camera 820 at some time period during which array 102b is projecting second patterned light 817b as determined by delayed PWM signals 754b so that camera 820 can capture an image of second patterned light 817b reflected from the surface 801 of object 802.

In the embodiment shown in FIG. 12, a first light pattern corresponding to the first projected patterned light 817a may be stored in a pattern (or 'frame') buffer 921a. First light pattern 817a may correspond to an array of delay values stored in delay table 918a. A second light pattern corresponding to second projected patterned light 817b may be stored in a pattern buffer 921b. Second light pattern 817b may correspond to an array of delay values stored in delay table 918b. It will be understood that variations of system 800 shown in FIG. 12 may include a single delay table that stores delay values for arrays 102a and 102b, and a single PWM controller that provides PWM signals to arrays 102a and 102b. Variations can also include more than two PWM controllers providing signals to arrays 102a, 102b. Persons of ordinary skill reading the present description will be able to extend the simplified example of FIG. 12 to a wide range of equivalent structural arrangements to implement the functions of controller 916.

FIG. 13 is a block diagram of another example implementation of system 800 in which headlights 408a, 408b comprise arrays of emitters (LED units 120) that are driven by PWM signals. In normal operation of arrays 102a, 102b shown in FIG. 13, LED units 120 comprising arrays 102a, 102b may be driven to emit light at respective corresponding target brightness levels in accordance with corresponding PWM signals. Target brightness levels can be set, for example by a dimming control which can be a manual or automatic dimming control. However, at periodic intervals the normal operation of headlights 408a and 408b may be interrupted and PWM controllers 700a, 700b may phase shift the PWM signals to implement sequence 3000 comprising the series of snapshots or states depicted in FIG. 9.

Sequence 3000 can be initiated in a number of ways. For example, in some embodiments controller 916 can send a START signal (not depicted) to PWM controllers 700a, 700b to initiate the sequence in response to a human operator manipulating a headlight switch or other user interface for controller 916. In other embodiments, sequence 3000 could be initiated by image synch timer 920 in response to occurrence of some pre-defined event that calls for camera 820 to capture an image of a scene in the travel path of vehicle 400. In other instances, sequence 3000 may be started in response to a signal that is received by the camera 820 or by another system located within the vehicle 400. Regardless of how sequence 3000 is initiated, once initiated PWM controllers 700a, 700b may respond as described below.

PWM controller 700a may phase shift all PWM signals being provided to the LED units 120 comprising array 102a so that each PWM signal drives its corresponding LED unit 120 to an OFF state at a time t=-1 ticks before t=0. At the same time, PWM controller 700b may drive LED units 120 of array 102b so the LED units are OFF (not emitting) or are emitting at relatively low intensity levels with respect to their highest achievable intensity levels between time t=0, and at least until such time as controller 916 deactivates patterned light 917a corresponding to the light emission pattern defined by the emitters of array 102a.

PWM controller 700a may shift the PWM signals for LED units 120 comprising array 102a so that starting at time t=0, each LED unit 120 switches from OFF to ON to define a sequence such as sequence 3000 in the example of FIG. 9 and in accordance with the example timing chart shown in FIG. 10. For example, PWM controller 700a may shift phases of the PWM signals to respective corresponding LED units 120 of array 102a so that a leading edge of a first PWM pulse of every PWM signal occurs at a time delayed with respect to t=0 by a given number of ticks of synch timer 920. An example of a leading edge of a drive pulse is indicated in FIG. 10 at 799. The number of ticks after t=0 at which the leading edge of a phase shifted PWM signal occurs may differ from one LED unit 120 to the next in accordance with a timing sequence such as the timing sequence depicted in the example timing diagram of FIG. 10.

For example, PWM controller 700a may shift the PWM signal for the LED unit 120 at position R1C1 of array 102a so that a leading edge of the next occurring PWM pulse occurs at time t=0, thereby driving LED R1C1 from OFF to ON at t=0. PWM controller 700a may shift the phase of the PWM signal corresponding to the LED unit at R1C2 so that the first leading edge of that PWM signal occurs at time corresponding to six ticks of synch timer 920 after t=0, as shown in FIG. 10. PWM controller 700a may shift the phases of each PWM signal for each of the remaining LED units 120 comprising array 102a so that each drive signal has a leading edge that occurs after a delay time A with respect to time t=0. Table 1 may provide example delay times that correspond to leading edges of drive signals shown in FIG. 10. After sequence 3000 ends at t=11, PWM controller 700a may switch all LEDs of array 102a OFF and PWM controller 700b may control LED units 120 of array 102b in accordance with the sequence described above for array 102a.

After that sequence corresponding to array 102b ends, the sequence may be repeated for array 102a such that switching between patterned light 817a and 817b may occur at a rate not less than 50 switches per second. In this embodiment as well as the other embodiments described herein, the switching may not cause a perception of flicker to human observers. In embodiments corresponding to FIGS. 9 and 10, an additional advantage may be provided in that not all LED units 120 of either array 102a or 102b may be switched on at the same time, thereby avoiding risk of damaging effects caused by sudden, large increases in the load presented to the vehicle power supply by arrays 102a, 102b having all LED units suddenly driving from OFF to ON simultaneously.

In the embodiment shown in FIG. 13, delay table memories 918a, 918b store delay tables containing delay times for phase shifting the PWM signals for each LED unit of arrays 102a, 102b respectively. The values contained in any given table may be determined in part by the dimensions of arrays 102a, 102b and in part by the particular light emission patterns selected for the patterned light to be projected by headlights 408a, 408b into travel path 20. Accordingly, pattern buffers (which can be implemented in any kind of memory including ROM, RAM and flash memories) can store values corresponding to a plurality of different light emission patterns and can indicate which of the light emission patterns is to be projected by headlight 408a and which is to be projected by headlight 408b at any given time.

Controller 916 may select a delay table from delay table memory 918*a*, 918*b* based on the indicated light emission patterns.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A camera comprising:
    a first imager that is configured to capture images of a roadway on which a vehicle is located when operating;
    a processor communicatively coupled to the first imager that is configured to, when operating:
        generate a signal to cause a first hybridized device in the vehicle to project a first patterned light in a non-visible spectrum on to an object on the roadway, wherein the first hybridized device comprises a silicon backplane and a monolithic array on the silicon backplane, the monolithic array comprising at least 20,000 light-emitting segments spaced 20 µm or less apart that are independently controllable in groups to project the first patterned light for a period of time that is less than a threshold of human perception,
        generate a signal to cause a second hybridized device to project a non-patterned light in a visible spectrum on the roadway,
        generate a signal to cause the first imager to capture an image of the first patterned light projected on the object,
        receive the image from the first imager, and
        detect the object on the roadway based on the first patterned light captured in the image.

2. The camera of claim 1, wherein the processor is further configured to:
    generate a signal to cause a second hybridized device to project a second patterned light on to the object on the roadway;
    generate a signal to cause a second imager to capture a second image of the first patterned light projected on to the object on the roadway, wherein the second imager is adapted to exclude the second pattern light projected by the second hybridized device and the first imager is adapted to exclude the first pattern light projected by the first hybridized device; and
    detect the object on the roadway based on the image from the first imager and the second image from the second imager.

3. The camera of claim 1, wherein the processor is further configured to select a pattern for the first patterned light based on at least one of:
    operating parameters of the vehicle, or
    the image of the first patterned light projected on the object captured by the first imager.

4. The camera of claim 1, wherein the processor is further configured to generate a signal to alert other systems in the vehicle when the object is detected.

5. A method of objection detection, the method comprising:
    causing, by a processor in a camera, a first hybridized device to project a first patterned light in a non-visible spectrum on to an object on a roadway on which a vehicle is located when operating wherein the first hybridized device comprises a silicon backplane and a monolithic array on the silicon backplane, the monolithic array comprising at least 20,000 light-emitting segments spaced 20 µm or less apart that are independently controllable in groups to project the first patterned light for a period of time that is less than a threshold of human perception;
    causing, by the processor in the camera, the first hybridized device to project a non-patterned light in a visible spectrum on the roadway
    causing, by the processor in the camera, a first imager to capture an image of the first patterned light projected on the object;
    receiving, by the processor in camera, the image from the first imager;
    detecting, by the processor in the camera, the object on the roadway based on the first patterned light captured in the first imager.

6. The method of claim 5, further comprising:
    generating, by the processor, a signal to cause a second hybridized device to project a second patterned light on to the object on the roadway;
    generating, by the processor, a signal to cause a second imager to capture a second image of the first patterned light projected on to the object on the roadway, wherein the second imager is adapted to exclude the second pattern light projected by the second hybridized device and the first imager is adapted to exclude the first pattern light projected by the first hybridized device; and detecting, by the processor, the object on the roadway based on the first image from the first imager and the second image from the second imager.

7. The method of claim 6, further comprising selecting a pattern for the first patterned light based on at least one of:
operating parameters of the vehicle, or
the image of the first patterned light projected on the object captured by the first imager.

\* \* \* \* \*